US011904564B2

(12) United States Patent
Debus et al.

(10) Patent No.: US 11,904,564 B2
(45) **Date of Patent: *Feb. 20, 2024**

(54) LINEAR-ACTUATED PRESS MACHINE HAVING MULTIPLE MOTORS AND CLUTCH SYSTEM FOR MULTI-SPEED DRIVE FUNCTIONALITY

(71) Applicant: PDInnovative LLC, Fenton, MO (US)

(72) Inventors: Jeffrey E. Debus, Ballwin, MO (US); Darrell B. Harrelson, St Peters, MO (US)

(73) Assignee: PDInnovative LLC, Fenton, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/148,011

(22) Filed: Dec. 29, 2022

(65) Prior Publication Data

US 2023/0136146 A1 May 4, 2023

Related U.S. Application Data

(63) Continuation of application No. 17/806,268, filed on Jun. 9, 2022, now Pat. No. 11,541,618.

(Continued)

(51) Int. Cl.
*B30B 1/18* (2006.01)

(52) U.S. Cl.
CPC ...................................... *B30B 1/18* (2013.01)

(58) Field of Classification Search
CPC ........... B30B 1/18; B30B 1/183; B30B 1/188; B30B 11/04
See application file for complete search history.

(56) References Cited

U.S. PATENT DOCUMENTS 5,488,880 A 2/1996 Sartorio
6,193,625 B1 2/2001 Ullrich (Continued)

FOREIGN PATENT DOCUMENTS

EP 0929396 B1 7/2000
EP 1894708 A1 3/2008

(Continued)

OTHER PUBLICATIONS

International Search Report and Written Opinion of International Searching Authority for International Patent Application No. PCT/US2022/044092, dated Mar. 8, 2023 (38 pages).

(Continued)

*Primary Examiner* — Matthew Katcoff
(74) *Attorney, Agent, or Firm* — Nixon Peabody LLP

(57) ABSTRACT

A press machine comprises a moveable press ram, an actuator, a first motor system, a second motor system, and a belt system. The moveable press ram holds a tool that forms a part. The actuator linearly moves the moveable press ram by use of a male-female thread mechanism. The actuator includes an actuator sprocket coupled to the male-female thread mechanism. The first motor system produces a high-force linear movement condition to the press ram, and includes a clutch coupled to a first motor and a first motor sprocket coupled to the clutch. The second motor system produces a high-speed linear movement condition to the press ram. The belt system couples the actuator sprocket, the first motor sprocket, and the second motor sprocket. The clutch allows the first motor to partially or fully disengage from rotational movement of the first sprocket when the belt is being driven by the second motor.

20 Claims, 20 Drawing Sheets

Related U.S. Application Data

(60) Provisional application No. 63/263,603, filed on Nov. 5, 2021, provisional application No. 63/261,453, filed on Sep. 21, 2021.

(56) References Cited

U.S. PATENT DOCUMENTS

| | | | |
|---|---|---|---|
| 6,640,601 | B2 | 11/2003 | Hatty |
| 7,284,407 | B2 | 10/2007 | Imaeda |
| 7,357,073 | B2 | 4/2008 | Aoshima |
| 7,413,029 | B2 | 8/2008 | Seno |
| 7,574,891 | B2 | 8/2009 | Futamura |
| 7,752,880 | B2 | 7/2010 | Sakamoto |
| 7,880,345 | B2 | 2/2011 | Hoffmann |
| 7,997,190 | B2 | 8/2011 | Patton |
| 8,220,384 | B2 | 7/2012 | Bosga |
| 8,715,132 | B2 | 5/2014 | Kopecek |
| 8,727,931 | B2 | 5/2014 | Hafner |
| 8,739,595 | B2 | 6/2014 | Hafner |
| 10,024,405 | B2 | 7/2018 | Emmons |
| 10,228,046 | B2 | 3/2019 | Parmar |
| 10,279,556 | B2 | 5/2019 | Imaeda |
| 10,696,000 | B2 | 6/2020 | Kosse |
| 10,828,858 | B2 | 11/2020 | Gontkosky |
| 10,919,248 | B2 | 2/2021 | Hattori |
| 10,927,933 | B2 | 2/2021 | Emmons |
| 10,962,090 | B2 | 3/2021 | Hafner |
| 2004/0170718 | A1 | 9/2004 | Futamura |
| 2005/0204798 | A1 | 9/2005 | Imaeda |
| 2006/0249038 | A1 | 11/2006 | Futamura |
| 2009/0071351 | A1 | 3/2009 | Patton |
| 2009/0247346 | A1 | 10/2009 | Hvolka |
| 2010/0050796 | A1 | 3/2010 | Eschborn |
| 2010/0206187 | A1 | 8/2010 | Hafner |
| 2013/0012349 | A1 | 1/2013 | Hafner |
| 2013/0074710 | A1 | 3/2013 | Kuboe |
| 2014/0202345 | A1 | 7/2014 | Wood |
| 2016/0243778 | A1 | 8/2016 | Imaeda |
| 2016/0273620 | A1 | 9/2016 | Hafner |
| 2019/0255791 | A1 | 8/2019 | Hattori |
| 2020/0147915 | A1 | 5/2020 | Mayer |
| 2020/0215778 | A1 | 7/2020 | Chiu |
| 2021/0231198 | A1 | 7/2021 | Emmons |

FOREIGN PATENT DOCUMENTS

| | | | |
|---|---|---|---|
| EP | 2375102 | A1 | 10/2011 |
| EP | 2432671 | A2 | 3/2012 |
| EP | 1570979 | B1 | 2/2013 |
| EP | 3065945 | B1 | 7/2019 |
| EP | 2158074 | B1 | 4/2020 |
| EP | 3286456 | B1 | 6/2020 |
| EP | 3552956 | B1 | 10/2020 |
| EP | 3752731 | A1 | 12/2020 |
| EP | 3093529 | B1 | 8/2021 |
| JP | S 60247496 | A | 12/1985 |
| JP | H 04243723 | A | 8/1992 |
| JP | H 04117718 | U | 10/1992 |
| JP | H 11221700 | A | 8/1999 |
| JP | 2008188631 | A | 8/2008 |
| JP | 4174150 | B2 | 10/2008 |
| JP | 4551144 | B2 | 9/2010 |
| JP | 5406502 | B2 | 2/2014 |
| JP | 5555679 | B2 | 7/2014 |
| JP | 5707206 | B2 | 4/2015 |
| JP | 2020151729 | A | 9/2020 |
| WO | WO 1992/012362 | A1 | 7/1992 |

OTHER PUBLICATIONS

International Search Report and Written Opinion of International Searching Authority for International Patent Application No. PCT/US2022/042591, dated Feb. 15, 2023 (16 pages).

LINEAR-ACTUATED PRESS MACHINE HAVING MULTIPLE MOTORS AND CLUTCH SYSTEM FOR MULTI-SPEED DRIVE FUNCTIONALITY

RELATED APPLICATIONS

This application is a continuation of U.S. patent application Ser. No. 17/806,268, filed Jun. 9, 2022, now allowed, which claims priority to U.S. Provisional Application Ser. No. 63/261,453, filed Sep. 21, 2021, and U.S. Provisional Application Ser. No. 63/263,603, filed Nov. 5, 2021, each of which is herein incorporated by reference in its entirety.

COPYRIGHT

A portion of the disclosure of this patent document may contain material which is subject to copyright protection. The copyright owner has no objection to the facsimile reproduction by anyone of the patent disclosure, as it appears in the Patent and Trademark Office patent files or records, but otherwise reserves all copyright rights whatsoever

FIELD OF THE INVENTION

The present invention relates to press machines for forming parts. More particularly, this invention relates to press machine that includes motors that are coupled to an actuator for driving the actuator in a linear direction at various speeds and with various torques.

BACKGROUND OF THE INVENTION

In a typical linear-actuated press, there are a pair of tools that are used to form a part. (e.g., a die used to bend a part). One tool in the pair of tools is typically stationary. The other tool moves in a linear fashion toward the stationary tool. The to-be-formed part is located between the pair of tools and is formed by the pressing force created by the moving tool. The linear motion of the moving tool is typically created by a motor that rotates a male-and-female screw mechanism that directly or indirectly couples the moving tool to the output shaft of the motor.

The moving tool in a linear-actuated press engages in linear movement in two directions. In the downward stroke, the moving tool is moved downwardly with no resistive force to the point in Which it engages the to-be-formed part. The tool then continues the downward movement as it engages the part to form it. In the upward stroke, the tool moves away from the now-formed part. The productivity of these machines (e.g., parts formed per unit time) is dependent on the speed at which the tool can be moved downwardly to engage the to-be-formed part and upwardly to move away from the formed part. This type of operation can be effectuated in smaller presses with fair productivity (e.g., 50 ton-presses or less) in that the same motor can deliver enough vertical speed to the moving tool and also enough torque to create the force necessary on the moving tool for forming the part.

However, in large presses (e.g., greater than 50-ton presses, such as a 100-ton press or more), the problem is that a motor cannot be commercially selected that delivers both the high-speed condition to advance the tool to the to-be-formed part and the high-torque condition necessary for forming the part. If the motor is chosen that is capable of delivering the high torque (i.e., to produce high force on the moving tool), its rotational speed and, hence, the vertical speed of the moving tool is limited. Thus, the machine's productivity is compromised because it takes too much time to advance the moving tool to the part and retract the tool from the formed part.

Consequently, large presses commonly utilize hydraulic actuators that can deliver the high forces for forming the part and do so with acceptable speed so as to have adequate productivity. However, there are several problems associated with hydraulic actuators, such as the temperature dependency of the working fluid and the messiness of hydraulic fluid that flows through various pumps, valves, and filters, often resulting in leaks of the fluid within the manufacturing facility. Furthermore, many large presses are driven by crankshafts that are critical components requiring significant bearings with tight tolerances and lubrications systems for preventive maintenance. Crankshafts for these high-force presses also require the use of a flywheels and counterbalance systems for creation of bearing journal clearances for lubrication, which that can also be problematic. Further, large presses using a crankshafts and flywheels often require to two or more connecting rods that attach to the ram slide and are subject to timing issues if they become twisted or bent. These crankshafts are subject to deformation when the mechanical press is under certain conditions, such as when they are overloaded or become stuck at bottom dead center.

The present disclosure provides for a linear-actuated press machine that delivers high forces (such as attainable in a hydraulic press) with the controllability and high speeds that increase productivity and without the problems associated with hydraulic presses. The linear-actuated press system also avoids the problems associated with high-force presses that use crankshafts for driving the press ram.

All these and other objects of the present invention will be understood through the detailed description of the invention below.

SUMMARY OF THE INVENTION

In one aspect, the present invention is directed to a press machine for forming a part, comprising a moveable press ram, an actuator, a first motor, and a second motor. The moveable press ram is for holding a tool that forms the part. The actuator moves the moveable press ram. The actuator includes a first male-female thread mechanism for producing a first linear movement of the moveable press ram and a second male-female thread mechanism for producing a second linear movement of the movable press ram. The first linear movement is a high-force linear movement condition and the second linear movement is a high-speed linear movement condition. The first motor drives the first male-female thread mechanism to produce the first linear movement. The second motor drives the second male-female thread mechanism to produce the second linear movement.

In another aspect, the present invention is a press machine for forming a part comprising a moveable press ram, an actuator, a first motor, and a second motor. The moveable press ram is for holding a tool that forms the part. The actuator moves the moveable press ram by use of at least one male-female thread mechanism for producing a linear movement of the press ram. The first motor drives the actuator to produce a high-force linear movement condition to the moveable press ram. The second motor drives the actuator to produce a high-speed linear movement condition to the moveable press ram. The first motor and second motor linearly move away from each other when the first motor is operational driving pressing ram. One way this is accomplished is by optionally mounting the second motor to the press ram such that it moves with the moveable press ram.

In a further aspect, a press machine for forming a part comprises a moveable press ram, an actuator, a first motor, and a second motor. The moveable press ram holds a tool that forms the part. The actuator moves the moveable press ram. The actuator includes a first male-female thread mechanism for producing a first linear movement of the moveable tool and a second male-female thread mechanism for producing a second linear movement of the movable press ram. The first linear movement is a high-force linear movement condition and the second linear movement is a high-speed linear movement condition. The first motor drives the first male-female thread mechanism to produce the first linear movement. The second motor for driving the second male-female thread mechanism to produce the second linear movement.

In another aspect, the invention is a method of operating a linear-actuated press machine for forming a part. The press machine comprises a first motor, a second motor, a linear actuator having a first male-female thread mechanism and a second male-female thread mechanism, and a tool coupled to the linear actuator. The method comprises (i) by use of the second motor and the second male-female thread mechanism, advancing the tool toward the part in a low-force and high-linear-speed condition, (ii) by use of the first motor and the first male-female thread mechanism, forming the part with the tool in a high-force and low-linear-speed condition, and (iii) after the part has been formed by the tool, retracting the tool from the part by use of at least one of the first motor and the second motor.

In another aspect, the invention is a press machine for forming a part comprises a moveable press ram, an actuator, a first motor system, a second motor system, and a belt system. The moveable press ram is for holding a tool that forms the part. The actuator moves the moveable press ram by use of a male-female thread mechanism for producing a linear movement of the moveable press ram. The actuator includes an actuator sprocket coupled to the male-female thread mechanism. The first motor system produces a high-force linear movement condition to the moveable press ram. The first motor system includes a clutch coupled to a first motor and a first motor sprocket coupled to the clutch. The second motor system produces a high-speed linear movement condition to the moveable press ram. The second motor system includes a second motor coupled to a second motor sprocket. The belt system couples the actuator sprocket, the first motor sprocket, and the second motor sprocket such that (i) operation of the first motor rotates the actuator sprocket, the first motor sprocket, and the second motor sprocket, and (ii) operation of the second motor rotates the actuator sprocket, the first motor sprocket, and the second motor sprocket. The clutch allows the first motor to partially or fully disengage from rotational movement of the first sprocket when the belt is being driven by the second motor.

In a further aspect, the invention is a method of operating a linear-actuated press machine for forming a part. The press machine comprises a first motor, a second motor, a linear actuator having a male-female thread mechanism, a tool coupled to the linear actuator, and a belt system coupling the first motor, the second motor, and the male-female thread mechanism. The method comprises (i) by use of the second motor and the belt system, advancing the tool toward the part in a low-force and high-linear-speed condition, (ii) while advancing the tool in the low-force and high-linear-speed condition, partially or fully disengaging the first motor from rotational movement caused by the belt system, (iii) by use of the first motor and the belt system, forming the part with the tool in a high-force and low-linear-speed condition, and (iv) after the part has been formed by the tool, retracting the tool from the part by use of the second motor.

In another aspect, the present disclosure is a method of operating a linear-actuated press machine for forming a part. The press machine comprises a first motor, a second motor, a linear actuator having a male-female thread mechanism, a press ram coupled to linear actuator and holding a tool, and a clutch coupled to the first motor. The method comprises (i) driving the linear actuator with the second motor to advance the press ram toward the part in a low-force and high-linear-speed condition, (ii) while advancing the press ram toward the part in the low-force and high-linear-speed condition, partially or fully disengaging the clutch so as to reduce the rotational movement on the first motor, (iii) driving the linear actuator with the first motor to form the part with the tool in a high-force and low-linear-speed condition, (iv) after the part has been formed by the tool, retracting the tool from the part by use of at least the second motor, and (v) while retracting the press ram from the part in a second low-force and high-linear-speed condition, partially or fully disengaging the clutch so as to reduce the rotational movement on the first motor.

In a further embodiment, a linear-actuated press machine for forming a part comprises a moveable press ram, an actuator, a first motor system, a second motor system, and a belt system. The moveable press ram holds a tool that forms the part. The actuator moves the moveable press ram by use of a male-female thread mechanism for producing a linear movement of the moveable press ram. The actuator includes at least one sprocket for driving the actuator. The at least one sprocket is coupled to the male-female thread mechanism for rotating the male-female thread mechanism. The first motor system produces a low-speed high-force linear movement to the moveable press ram via the actuator. The first motor system includes a first motor, a clutch operationally coupled to the first motor, and a first motor sprocket operationally coupled to the clutch. The second motor system produces a high-speed low-force linear movement to the moveable press ram via the actuator. The second motor system includes a second motor and a second motor sprocket operationally coupled to the second motor. The belt system couples the at least one actuator sprocket, the first motor sprocket, and the second motor sprocket. During the high-speed low-force linear movement of the second motor system to advance or retract the press ram relative to the part, the clutch is at least partially disengaged from the first motor to maintain a rotational speed of the first motor below a limit to reduce possible damage to the first motor. During the low-speed high-force linear movement of the first motor system to form the part, the clutch is operationally engaged to transfer high torque from the first motor to the linear actuator via the belt system.

In another embodiment, a press system for forming a part comprises a first linear actuator, a second linear actuator, a press ram, a high-speed motor, a first high-torque motor, a second high-torque motor, a first clutch, and a second clutch. The first linear actuator has a first male-female screw arrangement and a first actuator rod that is coupled to the first male-female screw arrangement. The first actuator rod undergoes linear movement in response to rotational movement of the first male-female screw arrangement. The second linear actuator has a second male-female screw arrangement and a second actuator rod that is coupled to the second male-female screw arrangement. The second actuator rod undergoes linear movement in response to rotational movement of the second male-female screw arrangement. The press ram is coupled to the first actuator rod and the second actuator rod. The press ram receives a tool for engaging and forming the part. The press ram undergoes movement toward or away from the part in response to the corresponding linear movement of the first and second actuator rods. The high-speed motor is coupled to the first male-female screw arrangement of the first linear actuator for providing a high-speed and low-force condition on the press ram. The high-speed motor is for advancing the press ram toward the part and retracting the press ram from the part. The first high-torque motor is coupled to the first male-female screw arrangement of the first linear actuator. The second high-torque motor is coupled to the second male-female screw arrangement of the second linear actuator. The first and second high-torque motors provide a low-speed and high-force condition on the press ram for forming the part. The first clutch that is operatively coupled to the first high-torque motor. The second clutch that is operatively coupled to the second high-torque motor. While the high-speed motor is providing a high-speed and low-force condition on the press ram, the first and second clutches are partially or fully disengaging so as to reduce the rotational movement on the first and second high-torque motors.

In another aspect, the invention is a press machine for forming a part comprising a moveable press ram, an actuator, a first motor system, and a belt. The moveable press ram is for holding a tool that assists in forming the part. The actuator moves the moveable press ram by use of a male-female thread mechanism for producing a linear movement of the moveable press ram. The actuator includes an actuator sprocket coupled to the male-female thread mechanism. The first motor system produces a linear movement to the moveable press ram via the actuator. The first motor system includes a first motor, a multi-speed gearbox coupled the first motor, and a motor sprocket coupled to the multi-speed gearbox. The belt couples the actuator sprocket and the motor sprocket. The multiple-speed gearbox allows the first motor to provide the linear movement (i) in a low-force and high-linear-speed condition to advance and retract the press ram and (ii) in a high-force and low-linear-speed condition when the press ram is forming the part with the tool.

In all of the aspects of the present invention defined above, the press machine produces at least 100 tons of force on the press ram for forming the part.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The present invention will be described with greater specificity and clarity with reference to the following drawings, in which.

Figure 1:
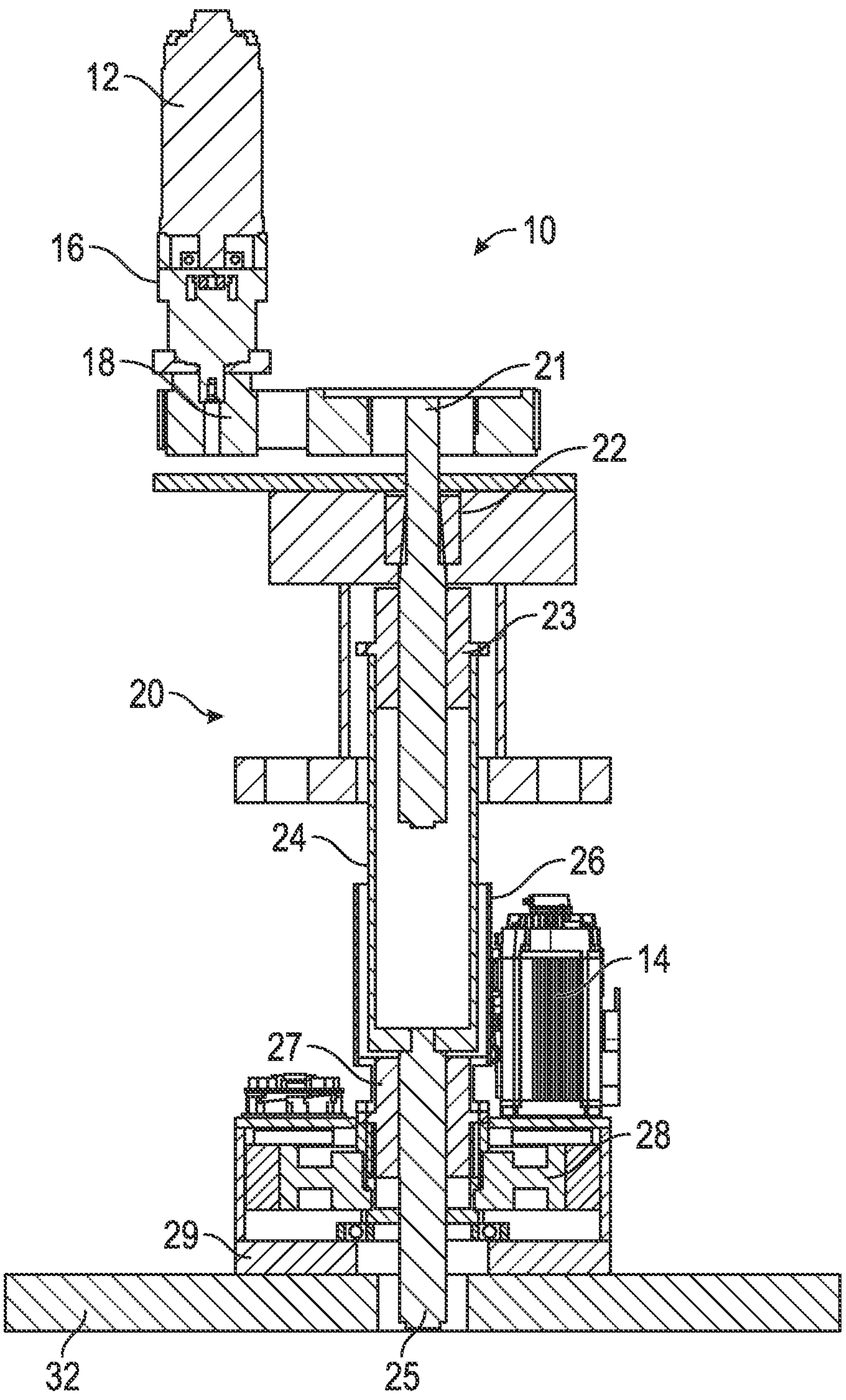
FIG. 1 illustrates a side view of one embodiment of a press machine that uses a linear actuator with two motors and two male-female threaded mechanisms for controlling the linear velocity and force of the press ram.

While the invention is susceptible to various modifications and alternative forms, specific embodiments will be shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE DRAWINGS

The drawings will herein be described in detail with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words “and” and “or” shall be both conjunctive and disjunctive; the word “all” means “any and all”; the word “any” means “any and all”; and the word “including” means “including without limitation.”

Figure 2:
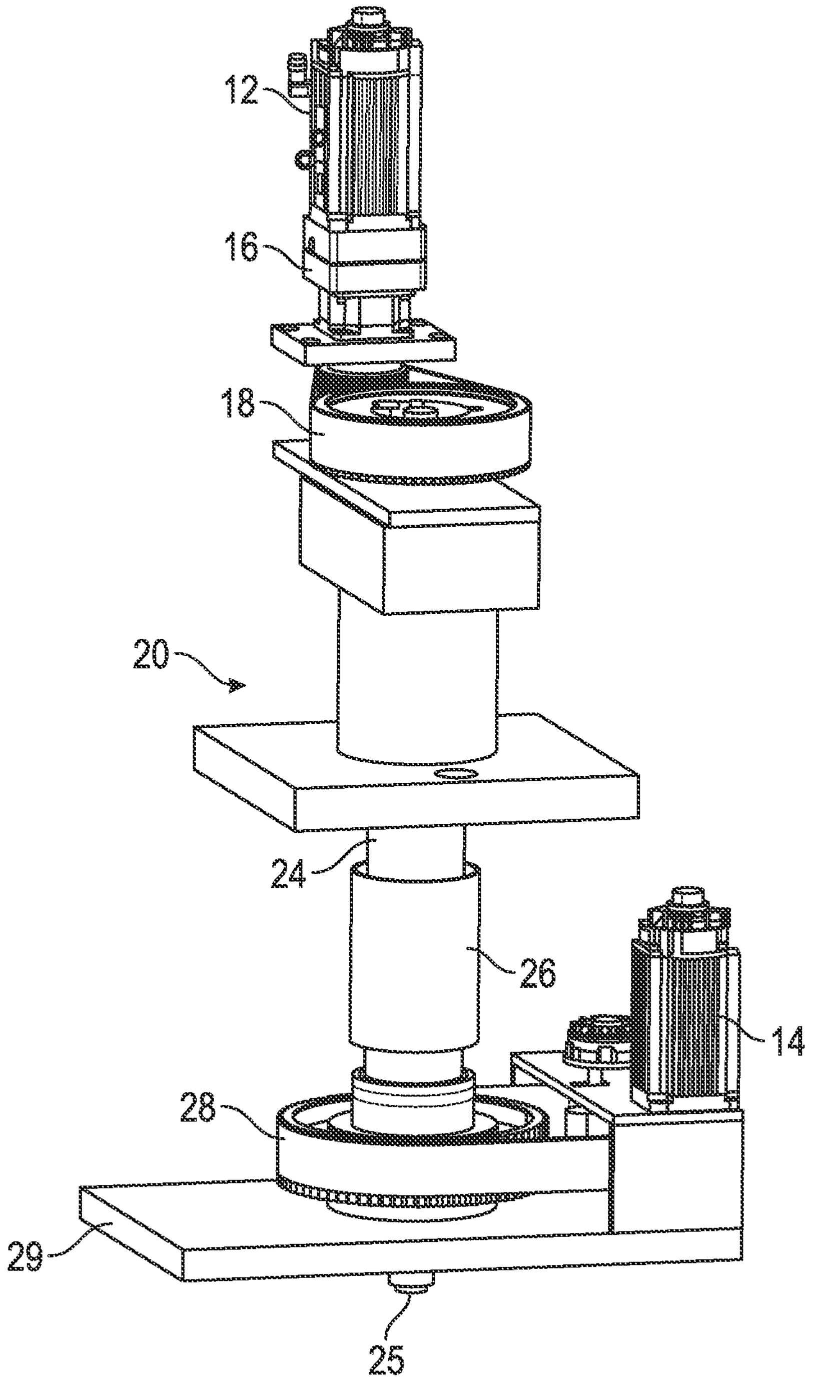
FIG. 2 illustrates a perspective view of the linear actuator for the press machine of FIG. 1.

As shown in FIGS. 1 and 2, a linear-actuated press machine 10 includes a first motor 12 and a second motor 14 (discussed further below) that are used to drive the press machine 10. A gearbox 16 is coupled to the output shaft of the first motor 12 and the output of the gearbox 16 is used to drive a pulley and belt system 18. The gearbox 16 allows for on-the-fly adjustments to the output of the first motor 12 before it is transferred to the pulley and belt system 18. The output shaft of the gearbox 16 spins slower than the input shaft from the first motor 12 at a fixed ratio. (e.g., when there is a 12:1 ratio, the input shaft RPM divided by 12 is the output shaft RPM). The gearbox 16 also increases the torque output of the first motor 12 by a factor corresponding to the fixed ratio. Therefore, the output shaft speed (and torque) of the gearbox 16 is a variable that depends on the variable input shaft from the first motor 12.

The pulley and belt system 18 is also coupled the linear actuator 20 by connection to the upper screw 21 of the actuator 20. Consequently, when the first motor 12 is operational, the upper screw 21 of the actuator 20 rotates as well. The upper screw 21 is permitted to rotate, without moving vertically, and is supported by at least one thrust bearing 22. The linear actuator 20 further includes a planetary roller nut 23 (or other threaded structure) that is threadably connected to the upper screw 21. The planetary roller nut 23 is externally shaped to non-rotationally lock within the structure of the actuator 20, such that rotation of the upper screw 21 causes vertical movement of the roller nut 23. The roller nut 23 is integrated with or connected to an upper tube 24 of the actuator. Consequently, when the first motor 12 is operational, the upper screw 21 is rotating at a known speed and with a known torque, which causes the roller nut 23 and upper tube 24 to linearly move at a known linear velocity and with a known force.

At its lower end, the upper tube 24 is also rigidly connected to a lower screw 25, such that any vertical movement of the upper tube 24 also causes corresponding vertical movement of the lower screw 25. The upper tube 24 is also telescopically fitted within a lower tube 26 that is coupled to a lower planetary nut 27 (or other threaded structure). As the second motor 14 operates, it turns a second pulley and belt system 28 that then rotates the lower planetary roller nut 27. As the lower planetary roller nut 27 rotates, it moves vertically along the fixed lower screw 25. The second motor 14, the second pulley and belt system 28, the lower planetary roller nut 27, and the lower tube 26 are all fixedly mounted on a platform 29. This platform 29, which is at the lower end of the actuator 20, is mounted to the press ram 32, which shown in more details in FIGS. 4A-4C, such that movement of the platform 29 leads to the movement of the press ram 32 (and any type of tool attached to the press ram 32), as discussed below.

Figure 3C:
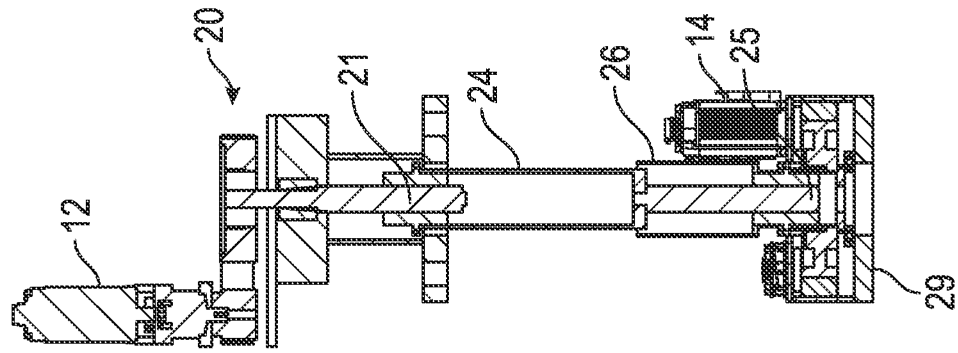
FIG. 3C illustrates a side view of the actuator of the linear-actuated press in which the high-speed section is fully extended and the high-force section is fully extended.
Figure 3B:
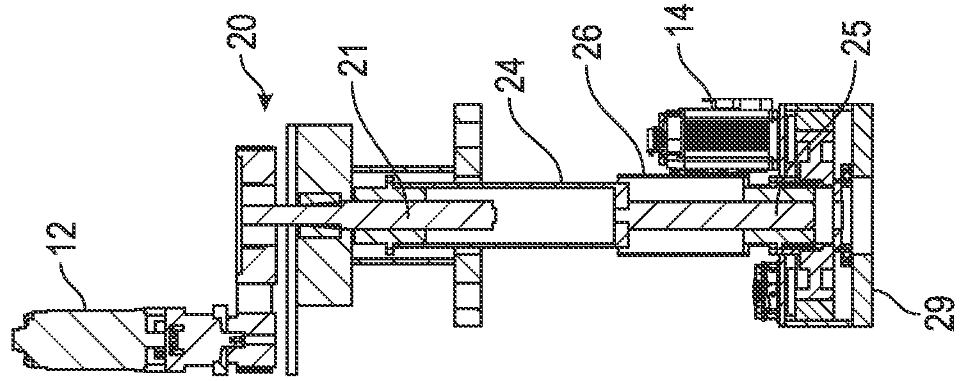
FIG. 3B illustrates a side view of the actuator for the linear-actuated press in which the high-speed section is fully extended.
Figure 3A:
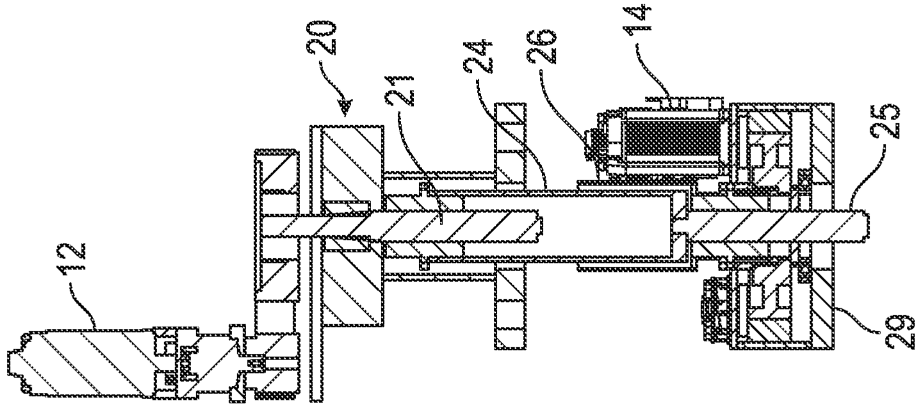
FIG. 3A illustrates a side view of the actuator for the linear-actuated press in a fully retracted position.
Figure 4C:
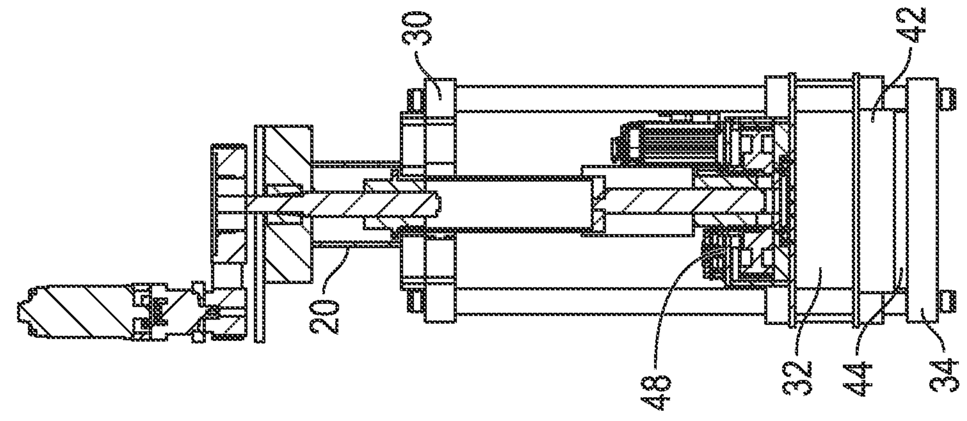
FIG. 4C illustrates the linear-actuated press in a closed state.
Figure 4B:
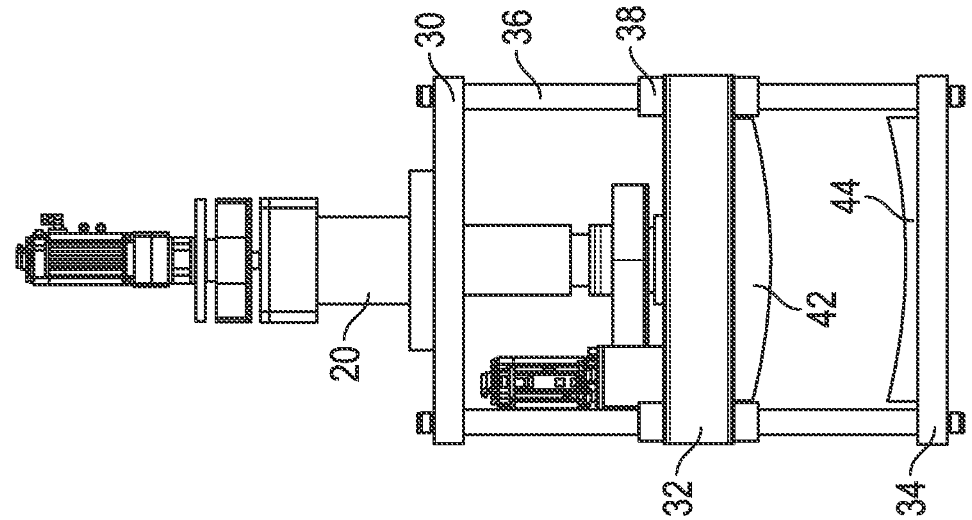
FIG. 4B illustrates a second side view the linear-actuated press in an open state.
Figure 4A:
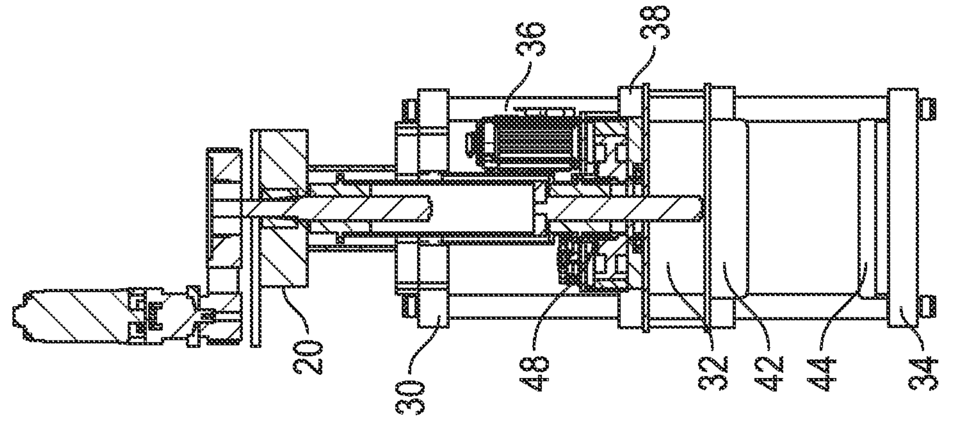
FIG. 4A illustrates a first side view the linear-actuated press in an open state.

FIGS. 3A-3C illustrate the operation of the actuator 20, which causes the platform 29 to move and drive the press ram 32 that is shown in FIGS. 4A-4C. FIG. 3A illustrates the actuator 20 in the fully retracted position, which would lead to the press machine 10 being in an opened position, as shown in FIGS. 4A and 4B. FIG. 3B illustrates the actuator 20 after the second motor 14 has been activated to cause high-speed rotation to the roller nut 27, causing it to rotate around the lower screw 25 and linearly move downwardly in a high speed condition along with the lower tube 26 and the platform 29 (and hence the press ram 32 of FIGS. 4A-4C). Because the press machine 10 is not forming the part in this phase of movement, the amount of torque required by the second motor 14 is low, allowing it to be designed for a high-speed movement to quickly advance the press ram 32 and attached tool to a point where the tool can begin forming the part.

Once the upper tool engages the part, the second motor 14 stops operation and the first motor 12 begins to operate, as shown in FIG. 3C. The first motor 12 causes the upper screw 21 to rotate at a lower speed, but with high-torque, which provides enough linear force on the upper tube 24 and the attached lower screw 25 that is fixedly attached to the upper tube 24. The telescopic movement of the upper tube 24 within the lower tube 26 helps to stabilize the actuator 20 while high downward force is transferred by the platform 29 to the press ram 32 (FIG. 4) and the attached upper tool. Thus, FIG. 3C illustrates the actuator 20 in a fully extended position that was brought about by the first male-female thread mechanism associated with the first motor 12, the second male-female thread mechanism associated with the second motor 14, and the telescoping upper and lower tubes 24, 26.

FIGS. 4A-4C illustrate the overall movement for the press 10 for forming a part in the press 10 based on the movements of the linear actuator 20 in FIGS. 3A-3C. FIGS. 4A and 4B are two side views of the press machine 10 in the opened position. The main body of the actuator 20 is mounted on the press crown 30, which remains in a fixed position. The vertical movement of the platform 29 caused by the actuator 20 creates corresponding vertical movement of the press ram 32 to which it is attached. The press ram 32 holds an upper tool 42 and a press bed 34 may hold a lower tool 44. The to-be-formed part (e.g., a piece of sheet metal) is placed between the upper tool 42 and the lower tool 44. The press ram 32, which is a four-post press, includes ram guide bushings 38 that slide along the ram guideposts 36 as the press ram 32 moves relative to the press bed 34.

As shown in FIG. 4C, the upper tool 42 and the lower tool 44 are in close proximity with the now-formed part located between them when the press machine 10 is in the closed position. To transition to that closed position, the second motor 14 creates the high-speed linear movement of the press ram 32 and the upper tool 42 until the upper tool 42 is in an operational or engagement position immediately adjacent to or on the to-be-formed part, which is typically resting on the lower tool 44. Then, the first motor 12 creates the high-torque linear movement (with slower linear speed) for the press ram 32 and the upper tool 42 to form the part with high force. After the part is formed, the second motor 14 operates in the reverse fashion to retract the upper tool 42 from the now-formed part with high linear speed, such that the formed part can be removed from the press machine 10 and a new unformed part can be inserted between the tools 42, 44 for forming in the next cycle.

Consequently, the linear force and linear speed of the press ram 32 is controlled by the operation of the first motor 12 and the second motor 14. During the downward advancement stroke when the press ram 32 and upper tool 42 are moving toward the to-be formed part, the linear motion of the press ram 28 is preferably at a high speed since no force is yet needed for forming at this point. This is accomplished by operating the second motor 14 that drives the lower roller nut 27, causing it to quickly rotate around the lower screw 25 (FIG. 1). When the upper tool 42 begins to engage the part, more force is needed. In this working stroke, the second motor 14 stops movement and the first motor 12 begins to drive the upper screw 21 with lower rotational speed, but with high torque, to advance the upper nut 23 downwardly along the upper screw 21 with high force. To aid in the high-torque condition, the rotation of the lower roller nut 27 is held by a brake 48 to prevent the lower roller nut 27 from inadvertently advancing upwardly along the lower screw 25 when the large force is placed on the press ram 32. In other words, the brake 48 ensures that the downward force on the press ram 32 does not result in any back-driving on the actuator 20 (i.e., unintended rotation of the lower roller nut 27 along the stationary lower screw 25 while higher force is being transferring to the press ram 32).

By using the two separate threaded screw mechanisms controlled by two separate motors 12 and 14, different types of outputs to the press ram 32 can be supplied. The overall productivity of the press machine 10 can be increased because the moving upper tool 42 can be quickly advanced to the to-be-formed part and quickly retracted from the formed part by use of the second motor 14, yet the high-force conditions (e.g., 100 tons, 125, ton, 150 tons, 200 tons, 300 tons, 400 tons) required to form the part can still be accomplished by the first motor 12. In one embodiment for a 100-ton press, the second motor 14 can operate at about 1500 RPMs with a gear reduction of 3:1 to produce an output of about 500 RPMs. The first motor 12 also operates at about 1500 RPMs with a gear reduction of 25:1 to produce an output of about 60 RPMs. The actuator screws 21, 25 may have a lead in the range of about 12 mm per revolution to about 30 mm per revolution (such as about 25 mm (about 1 inch) per revolution), which dictates the linear velocity of the two male-female thread mechanisms of the actuator 20. In one embodiment, the press ram 32 and upper tool 42 move at about 500 inches per minute when the second motor 14 is in operation and at about 60 inches per minute when the first motor 12 is in operation. In some embodiments, the second motor 14 includes a gear reduction in the range of 2:1 to 5:1. In some embodiments, the first motor 12 has a gear reduction in the range of 15:1 to 35:1.

Because the first and second motors 12 and 14 independently drive the two male-female threaded mechanisms of the linear actuator 20, they can be different motors for producing the desired result on the actuator 20 (i.e., high-linear speed and low-force conditions, or low-linear speed and high-force conditions). And because the press machine 10 allows one motor to be decoupled from the other motor (i.e., one motor rotates while the other motor is still), the possibility of one motor producing an undesirable condition on the other motor (e.g., RPM outside the other motor's limits) or on other parts associated with the other motor (e.g., the pulley systems) is eliminated. One novel aspect of this press machine 10 is that the second motor 14 moves with the platform 29 (i.e., the second motor 14 moves vertically relative to the first motor 12, as it rides along the platform 29) such that the second motor 14 remains in close proximity to the lower tube 26 and the lower nut 27 that it is controlling during operation, thereby limiting the size and weight of the various linkages (e.g., shafts, gears, pulleys, etc.) to these components that it drives.

Though the press machine 10 has been described by operation relative to a single actuator 20 that is driven by two motors 12 and 14, the present invention contemplates a linear press with multiple actuators 20 driving a single press ram 32 and upper tool 42, in which each of the multiple actuators 20 is associated with a pair of motors and the telescopic upper and lower tubes 24, 26. In such a design for a linear press, more force can be transferred to the upper tool 42 by multiple actuators 20, leading to more force for forming the part by use of the multiple actuators 20 acting in parallel. The present invention also contemplates a linear press in which the high-linear speed condition is produced by a single motor (in the position of the second motor 14) that drives the platform 29 downwardly with a high speed by providing power to multiple lower roller nuts 27 on the platform 29, but has multiple upper motors that produce the high-force conditions in parallel, driving multiple actuators 20 acting on the press ram 32. Further, the present invention contemplates multiple actuators 20 in which one actuator 20 includes a first motor for operation in the low-speed/high-force mode and a second motor for operation in the high-speed/low-force mode, and one or more additional actuators 20 having a motor for operation in the low-speed/high-force mode to deliver additional force as the part is being formed by the tool on the press ram 32. In such a system, the one actuator 20 may include a clutch that limits the rotational speed of the low-speed/high-force motors when advancing and retracting the press ram 32 in the high-speed/low-force mode so as to ensure the low-speed/high-force motors are not damaged by the high speeds.

Figure 5:
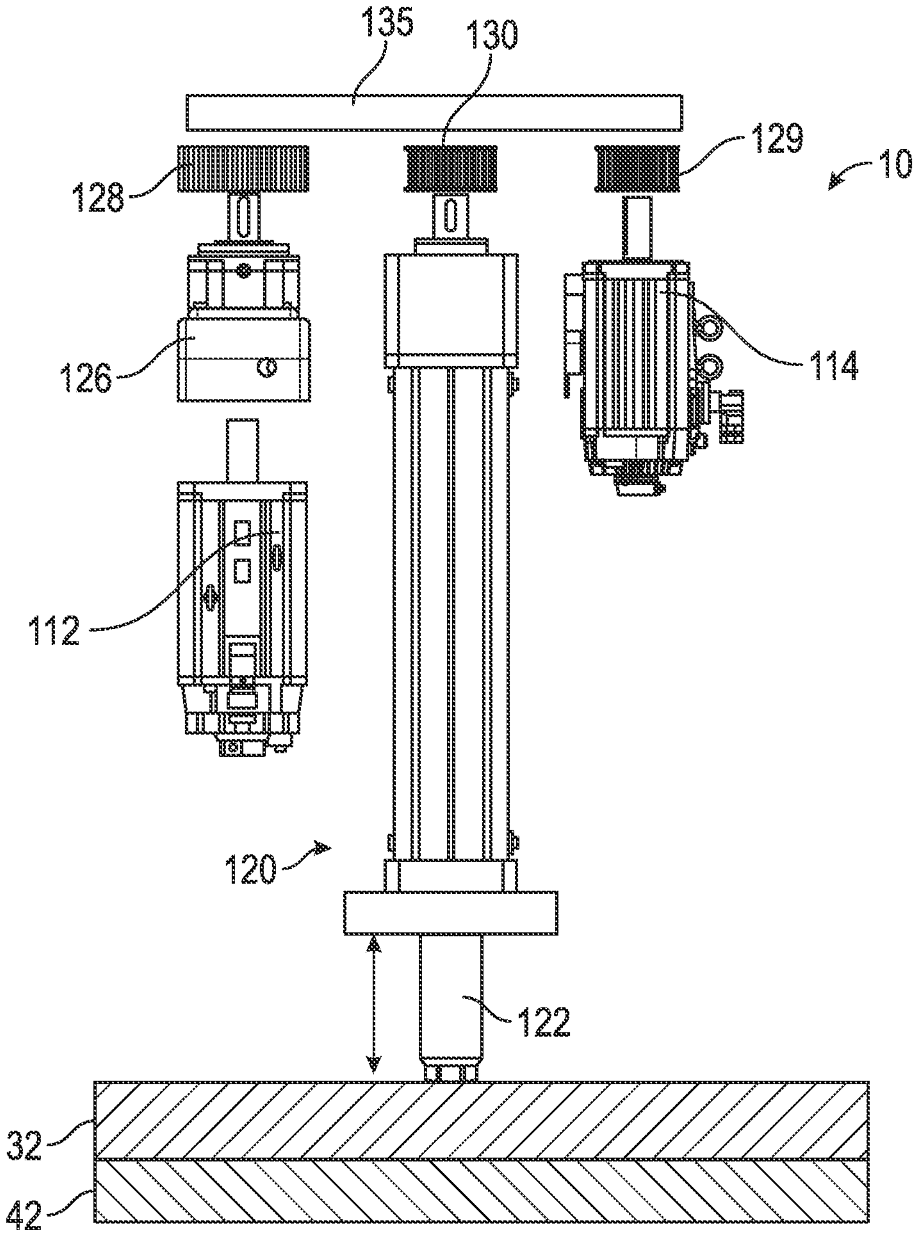
FIG. 5 illustrates the side view of an alternative embodiment of a linear-actuated press in which the press ram is moved by two motors linked to a single male-female threaded mechanism within the actuator.

FIG. 5 illustrates the side view of an alternative embodiment of an actuator 120 for a linear-actuated press machine 10 in which the press ram 32 and the upper tool 42 are moved by a first motor 112 producing high-force conditions and a second motor 114 for producing high-speed conditions. Like the previous embodiments, each of the motors 112, 114 is capable of delivering a variable speed to actuator 120 and the actuator 120 is a screw-driven linear actuator, which includes either a rotating screw and a non-rotating nut that vertically moves, or a fixed screw and a rotating nut that vertically moves (e.g., as described above in the embodiment of FIGS. 1-4). The actuator 120 includes an actuator rod 122 that moves due to this male-female threaded connection and is coupled to the press ram 32.

The first motor 112 is coupled to a clutch 126, which is coupled to a high-torque synchronous sprocket 128. On the other hand, the second motor 114 is directly coupled to a high-speed synchronous sprocket 129. The rotating portion of the male-female threaded connection of the actuator 120 is coupled to a synchronous drive sprocket 130. A synchronous belt 135 is coupled to all three sprockets 128, 129, 130, such that all three sprockets 128, 129, 130 are rotating in the same direction together. The three sprockets 128, 129, 130 may have different sizes, depending on the gear reduction desired among them.

In the embodiment of FIG. 5, the linear force and linear speed of the press ram 32 is controlled by the operation of the first motor 112 and the second motor 114. During the downward advancement stroke when the press ram 32 and the attached upper tool 42 are moving toward the to-be formed part, the linear motion of the press ram 32 is preferably high speed since no force is yet needed for forming at this point. This is accomplished by operating the second motor 114 that drives the high-speed sprocket 129, which thereby provides the driving force for the drive sprocket 130 and the screw-driven mechanism of the actuator 120 via the belt 135, causing a high-speed movement of the actuator rod 122. However, the high rotational speeds created by the second motor 114 would be too fast for the high-force motor 112. Thus, the corresponding movement in the high-torque sprocket 128 in the high-linear speed condition from the second motor 114 in the actuator 120 is received by the clutch 126, which spins without transferring the high rotational speeds to the shaft of the first motor 112.

In other words, the clutch 126 at least partially or fully disengages the shaft of the first motor 112 when the second motor 114 is operational.

When the upper tool 42 begins to engage the part that must be formed in the press 10, more force is needed. In this working stroke, the second motor 114 stops operational as the first motor 112 becomes operational. When this occurs, the clutch 126 is fully engaged to the first motor 112, causing the high drive torque from the first motor 112 to be transferred to the high-torque sprocket 128, which is then transferred to the drive sprocket 130 of the actuator 120. Thus, the actuator rod 122 advances downwardly at a lower speed, but with high force, to form the part. In the high-torque condition, the rotation of the high-speed sprocket 129 still occurs via the belt 135, but it is less rotational speed than when the second motor 114 is in operation. Thus, the second motor 114 is being driven by the first motor 112 at the speed chosen for the first motor 112. Of course, it is also possible to add more torque by powering the second motor 114 at the same speed dictated by the first motor 112 when forming the part.

In one embodiment for the press machine 110 of FIG. 5, the second motor 114 operates at about 1500 RPMs with a sprocket reduction of 3:1 to produce an input of 500 RPMs at the threaded-screw mechanism of the actuator 120. The first motor 112 also operates at about 1500 RPMs with a gear reduction of 25:1 to produce an input of 60 RPMs at the threaded-screw mechanism of the actuator 120. In some embodiments, the second motor 114 includes a sprocket gear reduction in the range of 2:1 to 5:1. In some embodiments, the first motor 112 has a sprocket gear reduction in the range of 15:1 to 35:1. Though each motor 112, 114 can spin at 1500 RPMs, due to the gear reduction ratios, rotating the second motor 114 at high levels (e.g., 1500 RPM) would cause the first motor 120 to rotate at much higher RPM levels (e.g., at 12,500 RPM) if the clutch 126 were not present, which would cause damage to the first motor 120.

The actuator screw (not shown) in the actuator 120 of FIG. 5 may have a lead in the range of about 12 mm per revolution to about 30 mm per revolution (such as about 25 mm (about 1 inch) per revolution), which dictates the linear velocity of the male-female thread mechanisms of the actuator 120. In one embodiment, the moving upper tool 42 moves at about 500 inches per minute when the second motor 114 is in operation and at about 60 inches per minute when the first motor 112 is in operation. The clutch 126 may be, for example, an air clutch although other type of clutches may be suitable. Because the first and second motors 112 and 114 separately drive the male-female threaded mechanism of the linear actuator 120, they can be different motors for producing the desired result on the actuator 120 (i.e., high-linear speed and low-force conditions, or low-linear speed and high-force conditions).

Figure 6:
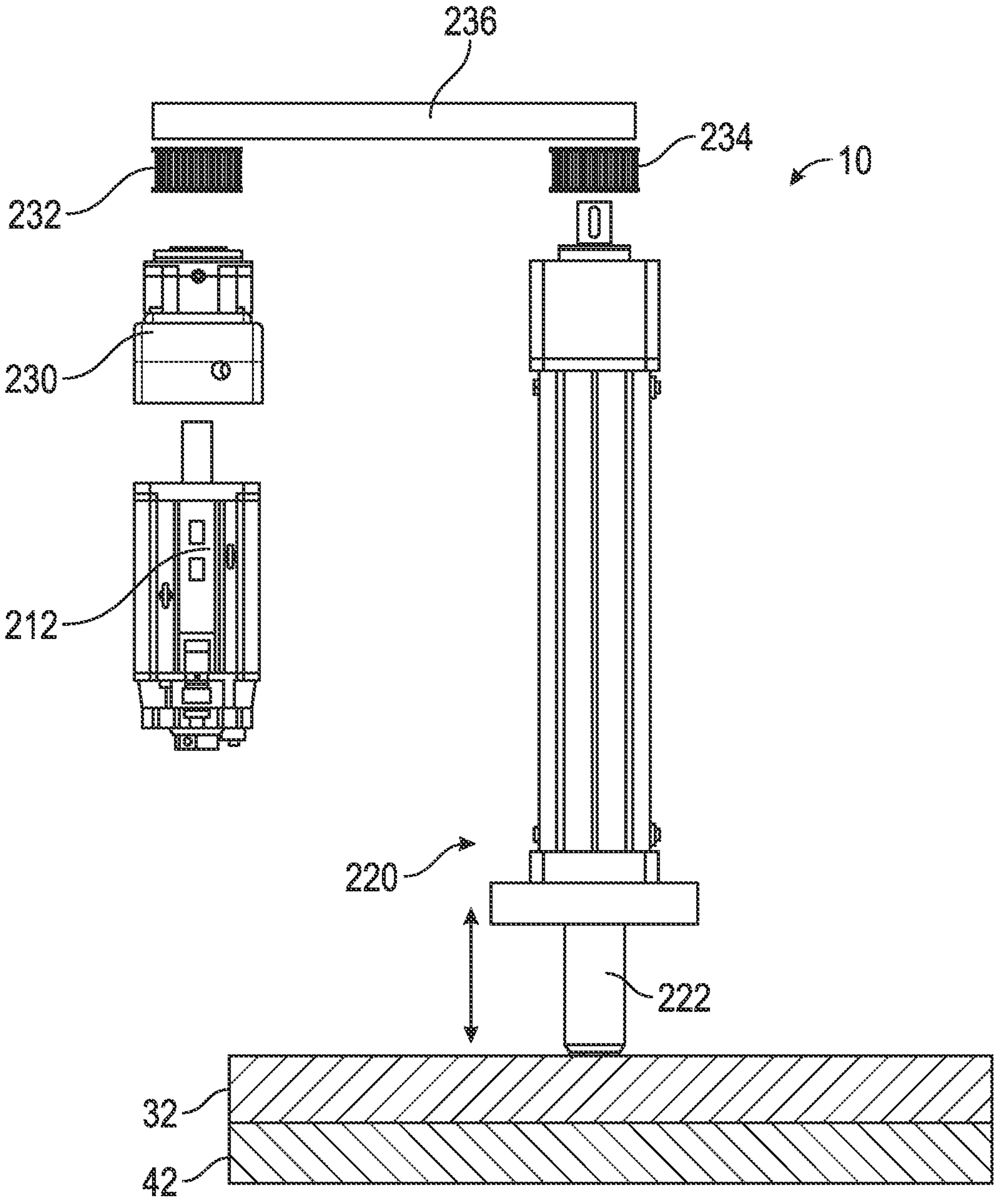
FIG. 6 illustrates the side view of another alternative embodiment of a linear-actuated press in which the press ram is moved by a single motor linked to a single male-female threaded mechanism within the actuator.
Figure 7A:
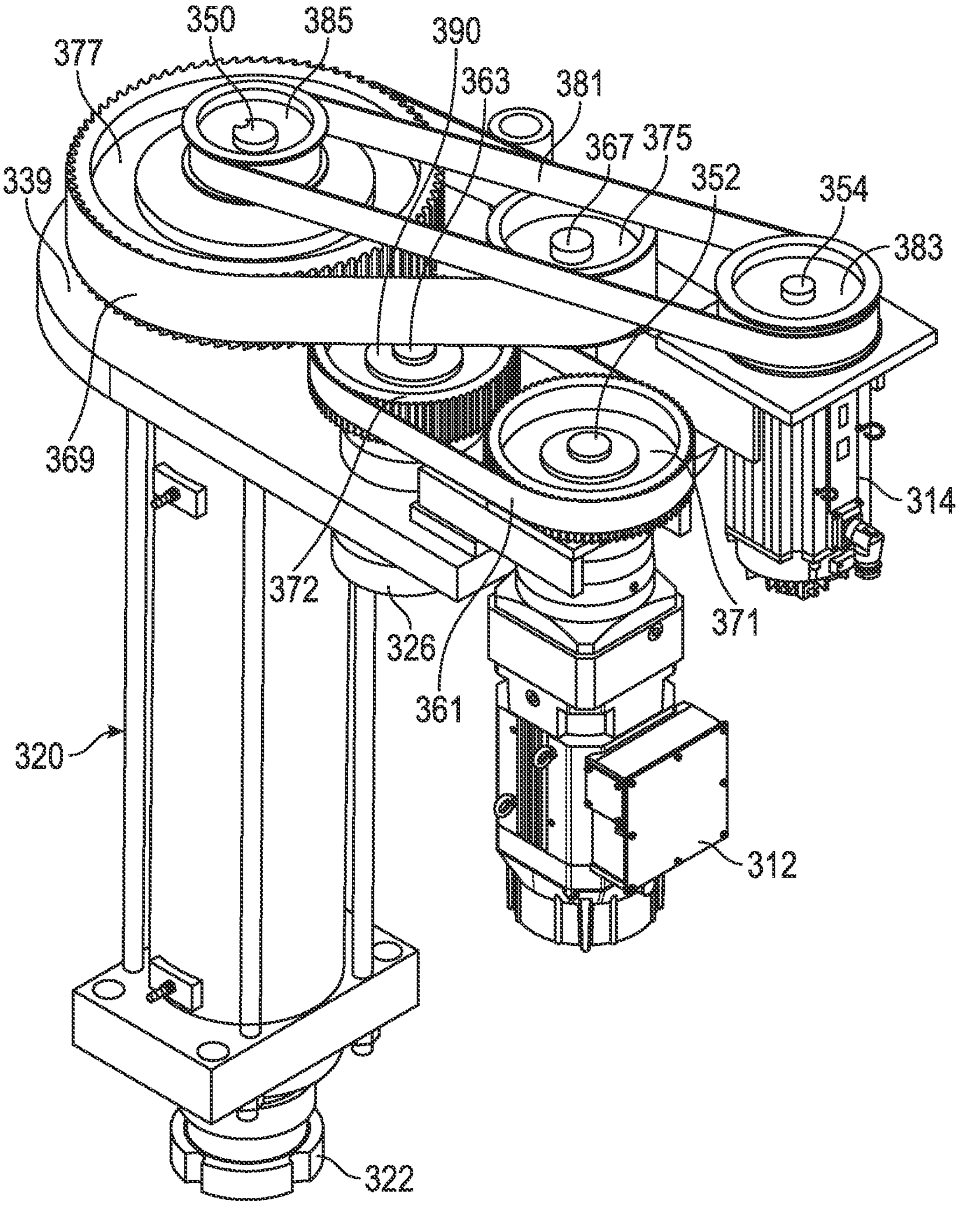
FIG. 7A is a perspective view of an alternative linear actuator having two motors and a clutch system.
Figure 7B:
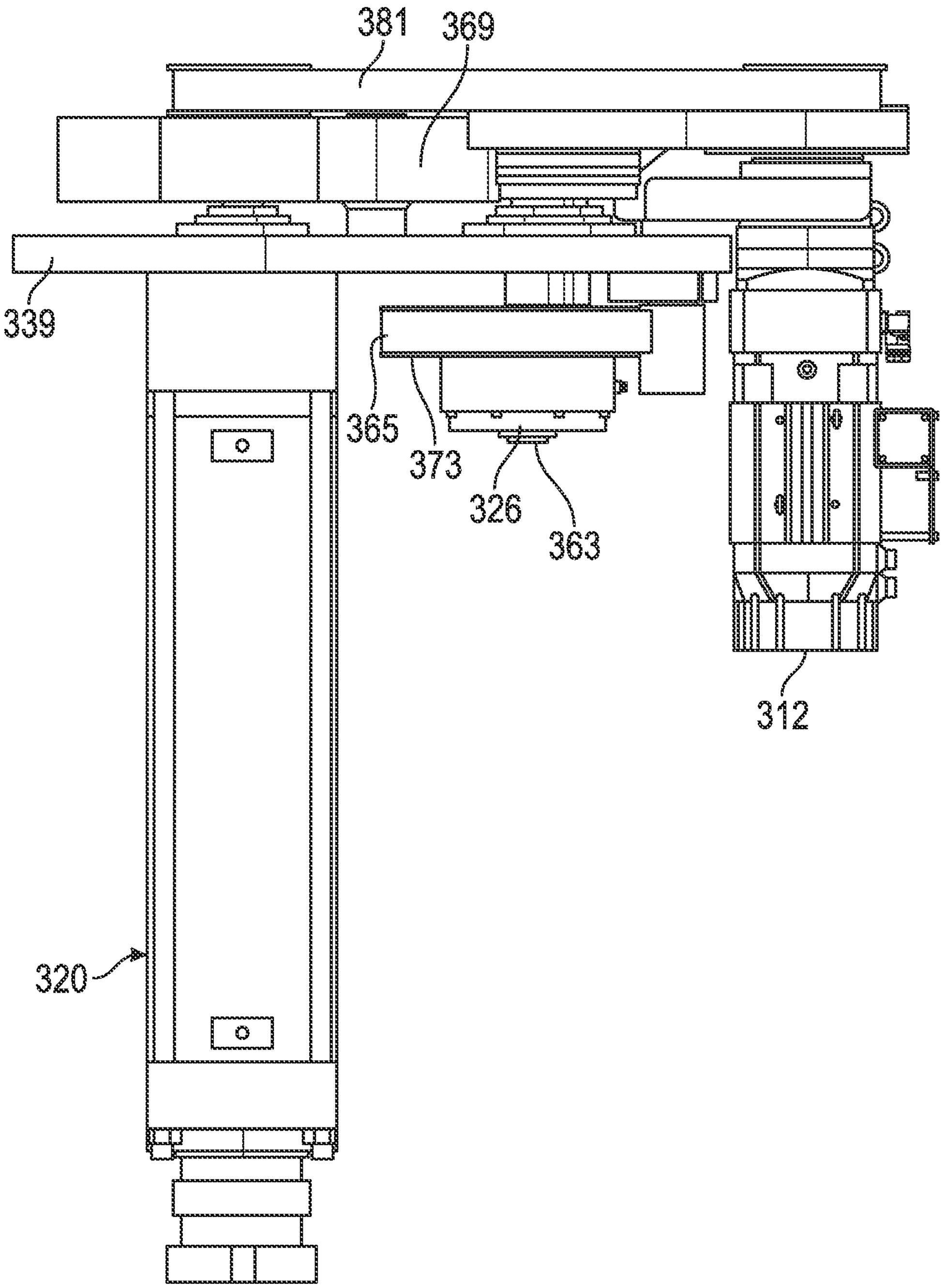
FIG. 7B is a side view of the alternative linear actuator of FIG. 7A.
Figure 7C:
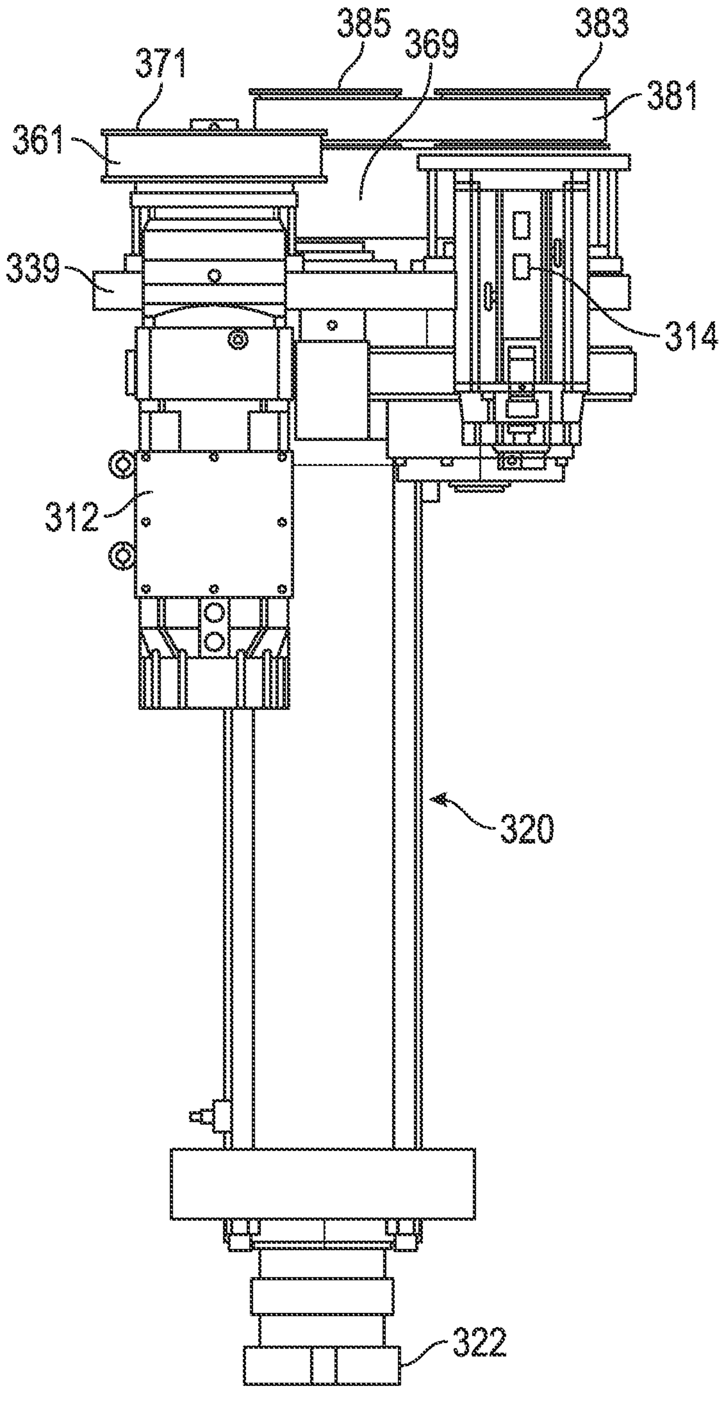
FIG. 7C is an end view of the alternative linear actuator of FIG. 7A.
Figure 7D:
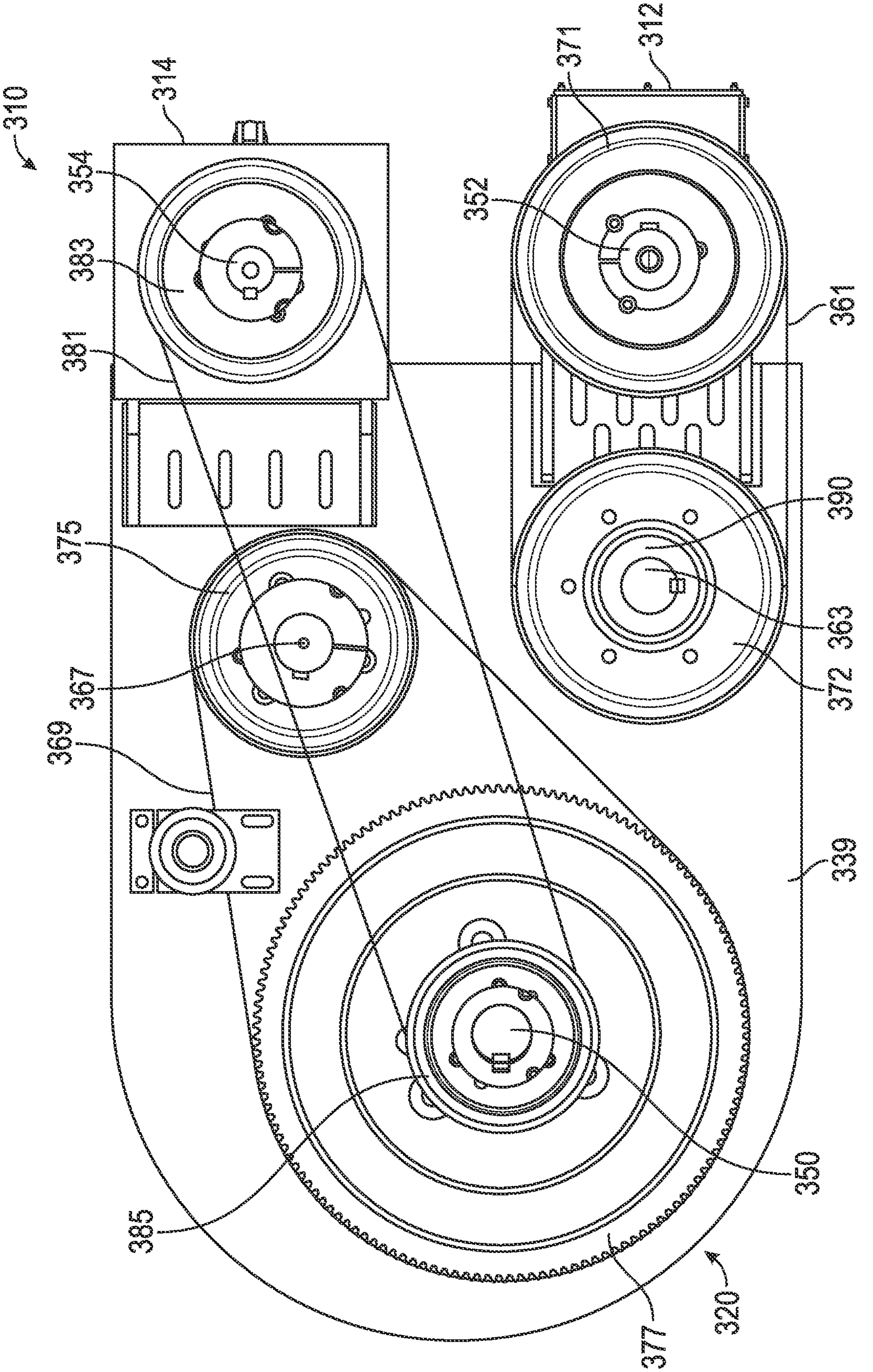
FIG. 7D is a top view of the alternative linear actuator of FIG. 7A.
Figure 7E:
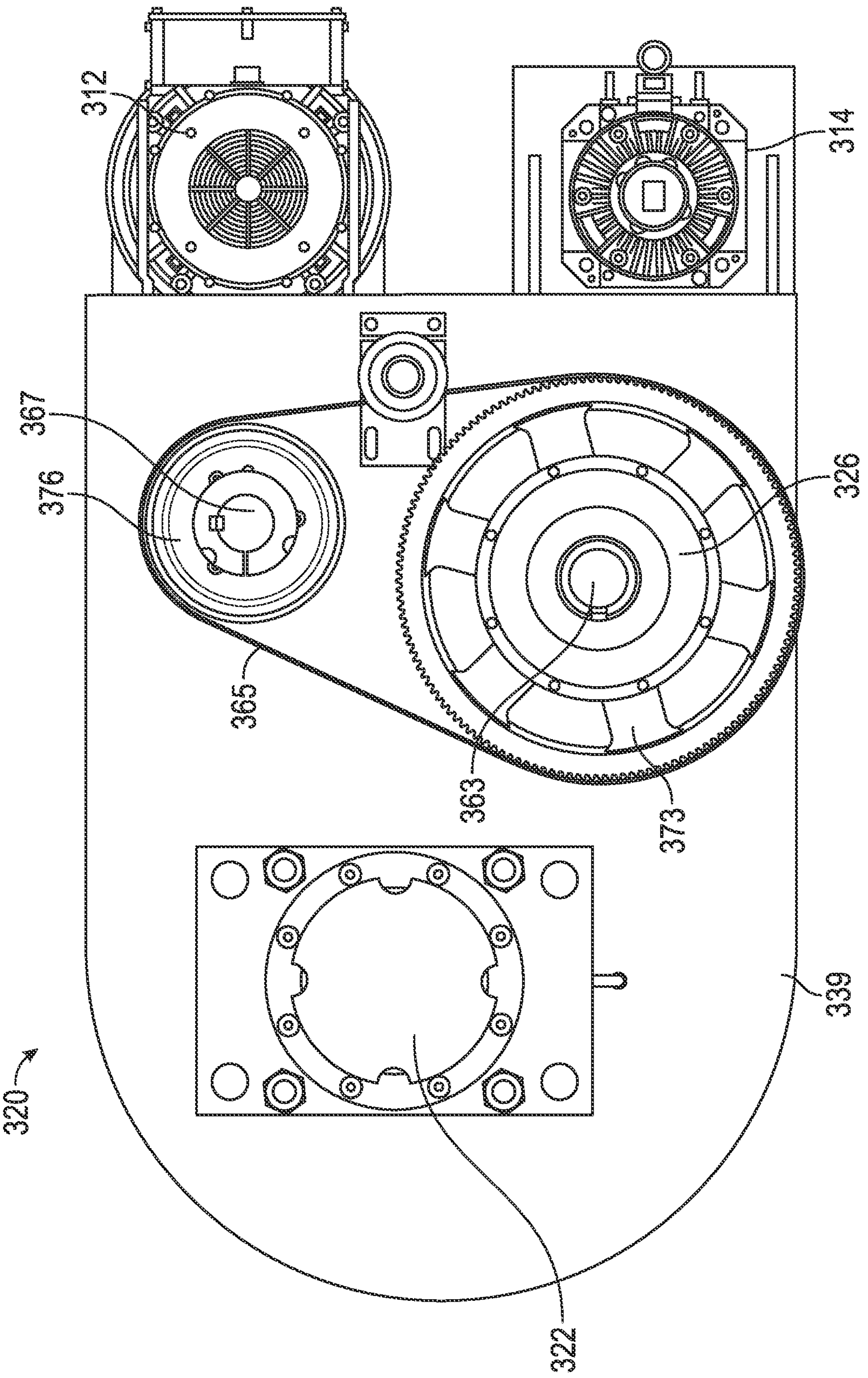
FIG. 7E is a bottom view of the alternative linear actuator of FIG. 7A.

FIG. 6 illustrates the side view of another alternative actuator 220 of a press machine 10 in which the press ram 32 is moved by a single motor 212 linked to a single male-female threaded mechanism within the screw-driven linear actuator 220. The motor 212 has a shaft that is linked to a multi-speed gearbox 230 that has an output shaft that drives a synchronous sprocket 232. The synchronous sprocket 232 is coupled to another synchronous drive sprocket 234 for the actuator 220 via a synchronous belt 236. The rotating portion of the male-female threaded connection of the actuator 220 is coupled to a synchronous drive sprocket 234.

In the embodiment of FIG. 6, the linear force and linear speed of the press ram 32 is controlled by the operation of only the first motor 212. During the downward advancement stroke when the press ram 32 and the upper tool 42 are moving toward the to-be formed part, the linear motion of the press ram 32 is preferably high since no force is yet needed for forming at this point. This is accomplished by operating the first motor 212 at a gear ratio, as dictated by the gearbox 230, that drives the sprocket 232 at a high speed, thereby causing a high linear-speed movement of the actuator rod 222 via the drive sprocket 234 of the actuator 220 and the belt 236. When the upper tool 42 begins to engage the part that must be formed, more force is needed. In this working stroke, the first motor 212 switches to a lower speed and the multi-speed gearbox 230 switches to a different gear needed to provide higher drive torque at the sprocket 232, which is then transferred to the drive sprocket 234 of the actuator 220. The multi-speed gearbox 230 includes an internal clutch to help switch between the gears. Thus, the actuator rod 222 advances downwardly at a lower speed, but with high torque, to form the part. When the part is fully formed, the motor 212 operates in the reverse direction and with a higher speed to retract the press ram 32 and the upper tool 42 from the formed part. In this retraction part of the cycle, the multi-speed gearbox 230 again shifts gears to help provide a high linear speed retraction.

FIGS. 7A-7E illustrate an alternative linear actuator 320 that is similar to the linear actuator 120 of FIG. 5 that included the clutch 126. The linear actuator 320 includes a first motor 312 and a second motor 314 that drive a ram for a press machine (exemplary press machines 400, 500, and 600 are shown in more detail in FIGS. 8-10 below), and a clutch 326 to protect the high-torque first motor 312 from the high rotational speeds that could otherwise damage the first motor 312 when the second motor 314 is advancing and retracting the press ram from the part.

Like the previous embodiments, the linear actuator 320 is preferably a screw-driven linear actuator that includes either a rotating screw and a non-rotating nut that vertically moves an actuator rod 322, or a fixed screw and a rotating nut that vertically moves the actuator rod 322 (e.g., as described above in the embodiment of FIGS. 1-4). The actuator 320 moves the actuator rod 322 due to the first motor 312 and the second motor 314 driving this male-female threaded connection via an actuator input shaft 350 that is coupled to the male-female threaded connection of the actuator 320. The first motor 312 causes the actuator rod 322 to linearly move at a lower speed, but with a high force for forming the part in the press machine. The second motor 314 causes the actuator rod 322 to linearly move at a high speed, but with a lower force for advancing and retracting the press ram relative to the part when little force is needed (other than to move the weight of the press ram). In the illustrated embodiment, a platform 339 is used to mount various parts of the actuator 320, the first motor 312, the second motor 314, and the belt system, which is described in more detail below.

The actuator input shaft 350 is driven by a belt system that includes a first belt system coupling the actuator input shaft 350 and a first motor drive shaft 352, and a second belt system coupling the actuator input shaft 350 and a second motor drive shaft 354. The first and second belt systems can include belts and various pulleys and/or sprockets that drive or are driven by the belts. As used in this patent application, the term "sprocket" includes both traditional sprockets with teeth that engage a chain or belt, pulley sprockets that resemble pulleys but have smaller radially extending projections (e.g., small teeth) for engaging grooves within a belt, and also pulleys with a smooth surface for engaging a smooth belt. The skilled artisan will understand that these various types of pulleys and sprockets are circular driving mechanisms that can be interchanged in many arrangements.

In one illustrated embodiment, the first belt system includes a first belt 361 coupling the first motor drive shaft 352 and a first intermediate shaft 363, and a second belt 365 (FIGS. 7B and 7E) coupling the first intermediate shaft 363 and a second intermediate shaft 367. A third belt 369 couples the second intermediate shaft 367 to the actuator input shaft 350. Each of the shafts 352, 363, 367, 350 is associated with a circular driving mechanism to receive and rotate with the first belt 361, the second belt 365, and the third belt 369.

In the illustrated embodiment of FIGS. 7A-7E, the first motor shaft 352 is associated a first motor sprocket 371. The first intermediate shaft 363 is associated with a first intermediate top sprocket 372 for engaging the first belt 361, and a first intermediate bottom sprocket 373 (FIGS. 7B and 7E) for engaging the second belt 365. The terms "top" and "bottom" are used to indicate the location relative to the platform 339. The second intermediate shaft 367 is associated with a second intermediate top sprocket 375 for engaging the third belt 369, and a second intermediate bottom sprocket 376 (FIG. 7E) for engaging the second belt 365.

Lastly, the actuator input shaft 350 is associated with a circular driving mechanism, which is a first actuator sprocket 377 that is driven by the third belt 369. The ratio of the diameters of the pulleys and/or sprockets in the first belt system dictate the transfer of speed and torque from the first motor shaft 352 to the actuator input shaft 350. In one embodiment, the first motor shaft 352 rotates at a speed of about 250 RPM and delivers about 1050 Nm of torque, causing the actuator input shaft 350 to rotate at a speed of about 50 RPM and delivers about 5200 Nm of torque. As such, in this embodiment, the torque output from the first motor shaft 352 is increased by the first belt system by about a factor of 5 relative to the torque at the actuator input shaft 350 that ultimately drives the actuator rod 322. The present invention contemplates the first belt system increasing the torque output from the first motor shaft 352 to the actuator input shaft 350 in the range of 3 to 7. Although the first belt system of the illustrated embodiment includes three belts 361, 365, 369 and two intermediate shafts 363, 367, other configurations for the first belt system are available as well.

By use of the first intermediate shaft 363 and the second intermediate shaft 367 in the first belt system, the drive system associated with the first motor 312 can include additional components for enhancing performance of and protecting the first motor 312. Specifically, the clutch 326 is mounted on the first intermediate shaft 363 below the platform 339 and limits the rotational speed of the first intermediate top sprocket 372, which, in turn, limits the rotational speed of the first motor 312 via the first belt 361. The clutch 326 is preferably a bi-directional clutch such that it can limit the rotational speed of the first motor 312 when necessary. During the high-speed low-force linear movement of the second motor 314 to advance or retract the press ram relative to the part, the clutch 326 is at least partially disengaged from the first motor 312 to maintain a rotational speed of the first motor shaft 352 and, hence, the first motor 312 below a limit to reduce possible damage to the first motor 312. However, when the part is being formed during the low-speed high-force linear movement of the press ram caused by the first motor 312, the clutch 326 is fully engaged to the first motor 312 to transfer high torque from the first motor 312 to the linear actuator 320 via the first belt system.

The first belt system may optionally include a torque limiter 390 that is also associated with the first intermediate shaft 363. The purpose of the torque limiter 390 is to mechanically limit the maximum torque transferred into the male-female threaded mechanism to protect the screw, the nut, the bearings, and associated power transmission components from unanticipated events. Errors in tooling set up or product loading can result in the press ram and tool making contact with the work piece before the programmable controller begins ramping down the speed from the second motor 314, resulting in undesirable forces being experienced throughout the system.

The second belt system in FIGS. 7A-7E includes a second-motor belt 381 that directly couples the second motor drive shaft 354 and the actuator input shaft 350. Unlike the first belt system, there are no intermediate shafts that rotate when the second motor 314 is driving the actuator 320. As shown, the second-motor belt 381 engages a second-motor pulley 383 associated with the second motor drive shaft 354 and an actuator pulley 385 associated with the actuator input shaft 350. As the second motor 314 is used for the high-speed, low-force movement of the actuator rod 322 and press ram coupled thereto, the ratio of the diameters of second-motor pulley 383 and the actuator pulley 385 dictates the speed of the actuator input shaft 350 relative to the second motor drive shaft 354. In one embodiment, the ratio of the diameter of second-motor pulley 383 to the diameter of the actuator pulley 385 is in the range from about 2:1 to about 3:1.

Because the actuator input shaft 350 has the actuator pulley/sprocket 385 that is driven by the second motor 314 and the first actuator sprocket 377 that is driven by the first motor 312, the drive function of either motor 312, 314 results in rotation of the motor input shaft of the other motor. Hence, the clutch 326 limits the rotational speed of the first motor 312 when the second motor 314 is driving the actuator 320 at a high rotational speed. On the other hand, when the actuator 320 is driven by the first motor 312, the actuator pulley/sprocket 385 is still rotating the second-motor belt 381, which causes the second motor 314 to also rotate. Thus, the second motor 314 is preferably operational to deliver some smaller amount of additive torque when the first motor 312 is powered in the working stroke of the cycle when the part is being formed.

Figure 8:
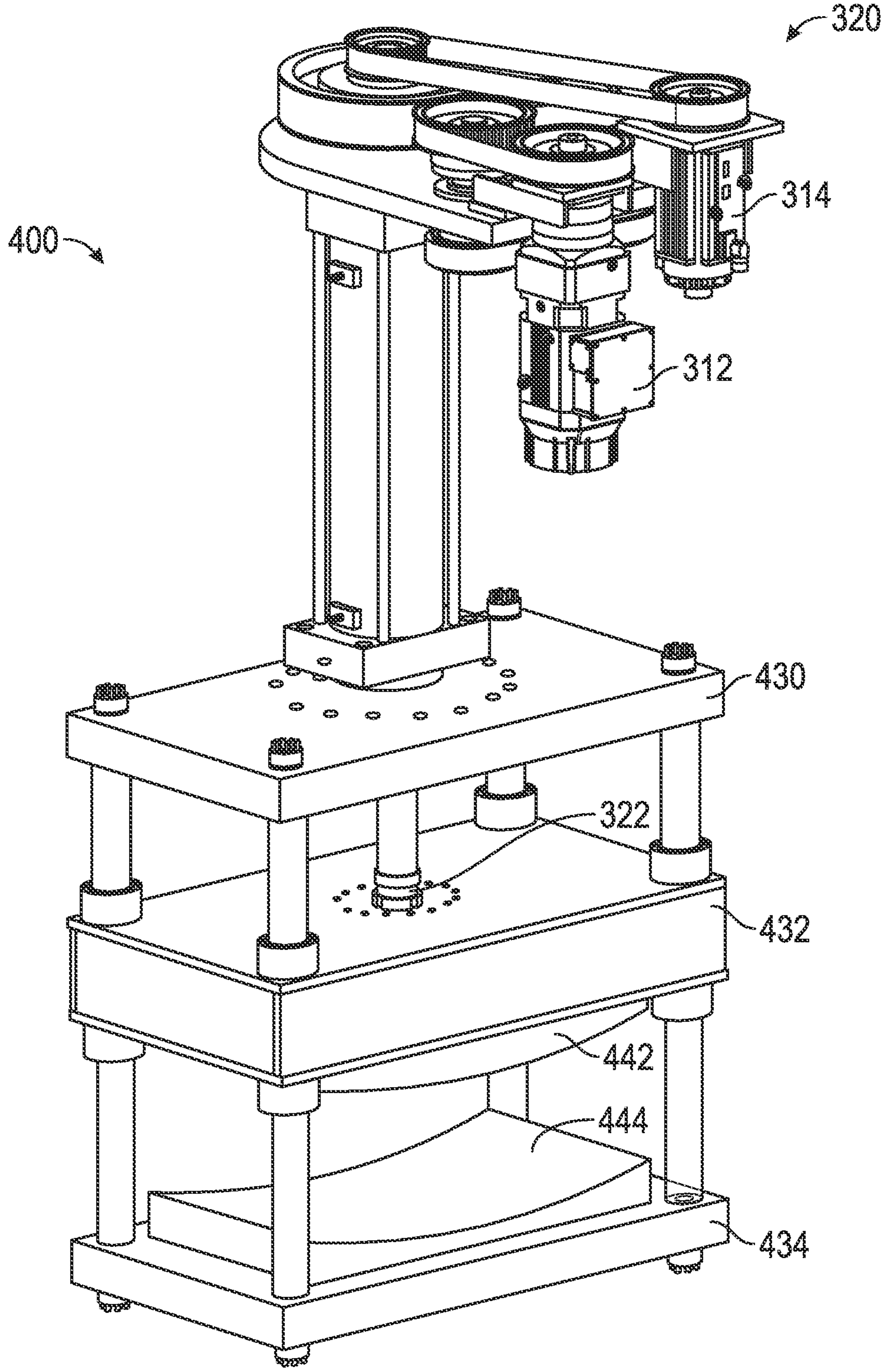
FIG. 8 is a perspective view of a four-post press machine that is driven by the linear actuator of FIG. 7.

FIG. 8 illustrates the actuator 320 of FIG. 7 within a four-post press 400. The actuator 320 is mounted to the stationary press crown 430 and the actuator rod 322 is mounted to the press ram 432. The press ram 432 moves under the power of the actuator rod 322 to and from the press base 434 based on the outputs of the first motor 312 and second motor 314, as described above relative to FIG. 7. The press ram 432 holds an upper tool 442 and the press base 434 holds a lower tool 444. A part is formed by the four-post press 400 between the upper tool 442 and lower tool 444. As shown, the upper tool 442 and lower tool 444 are for forming a curved sheet-metal part, but a variety of different forming, cutting, and punching tools can be applied to the press 400. The press machine 400 may include a brake to hold the position of the press ram 432 when the press machine 400 is powered down or at a steady state.

When the part is being formed during the low-speed, high-force stroke of the cycle, both of the first motor 312 and the second motor 314 are rotating as the low-speed, high-force first motor 312 provides power to the actuator 320 because there is no clutch or mechanism to disconnect the second motor 314 from the actuator 320. In other words, while the actuator 320 is being powered by the first motor 312, the second-motor belt 381 is still turning due to the rotation of the actuator sprocket or sprocket 385 (see FIGS. 7A and 7D), which causes the second motor 314 to rotate. As such, during the low-speed, high-force stroke of the cycle, the second motor 314 is preferably operational to provide torque (albeit a smaller amount of torque relative to the torque provided by the first motor 312) such that the torque of the high-speed, low-force second motor 314 is additive to the torque of the low-speed, high-force first motor 312.

Figure 9A:
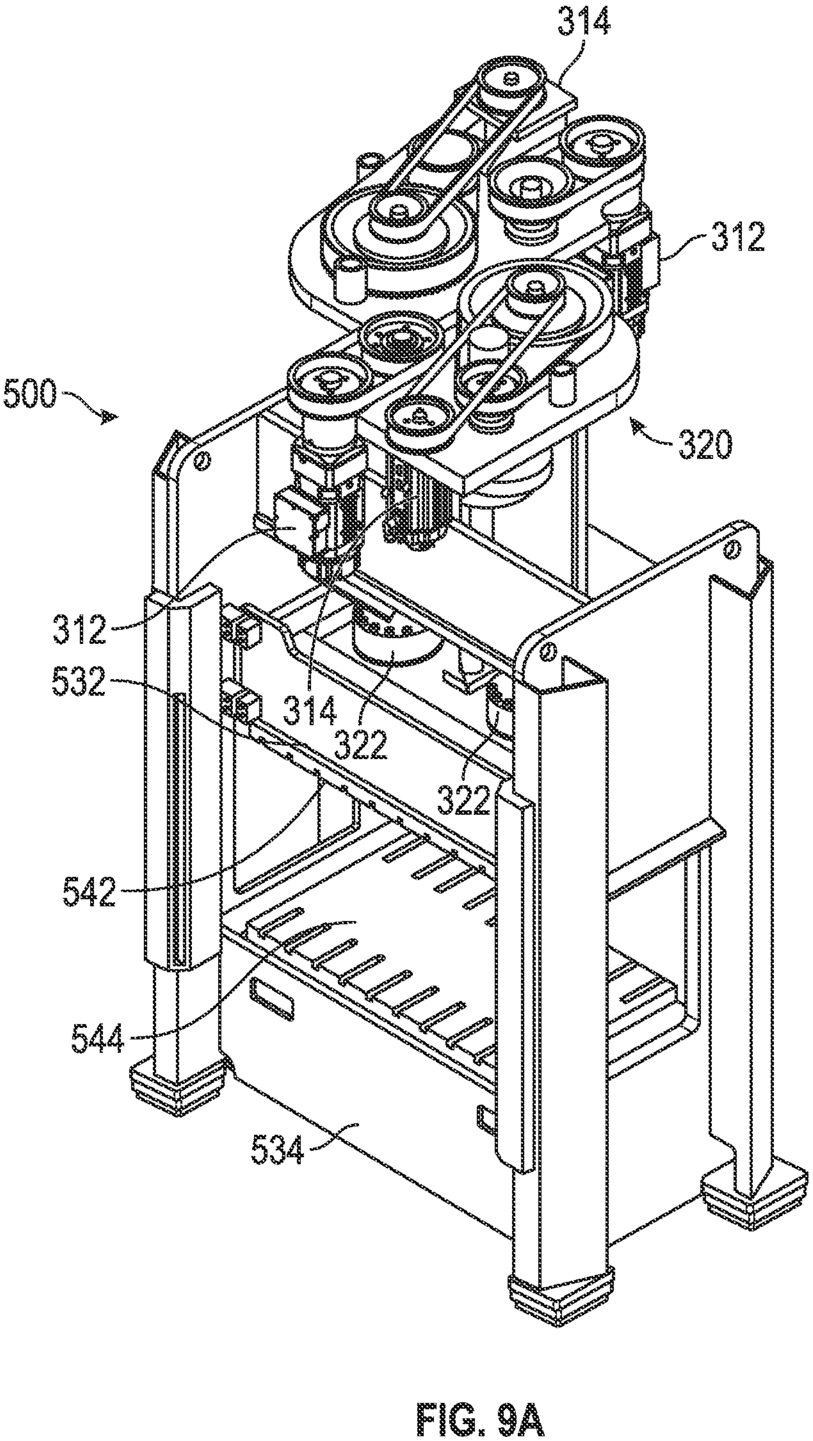
FIG. 9A is a perspective view of a gib-style press machine that is driven by multiple linear actuators illustrated in FIG. 7.
Figure 9B:
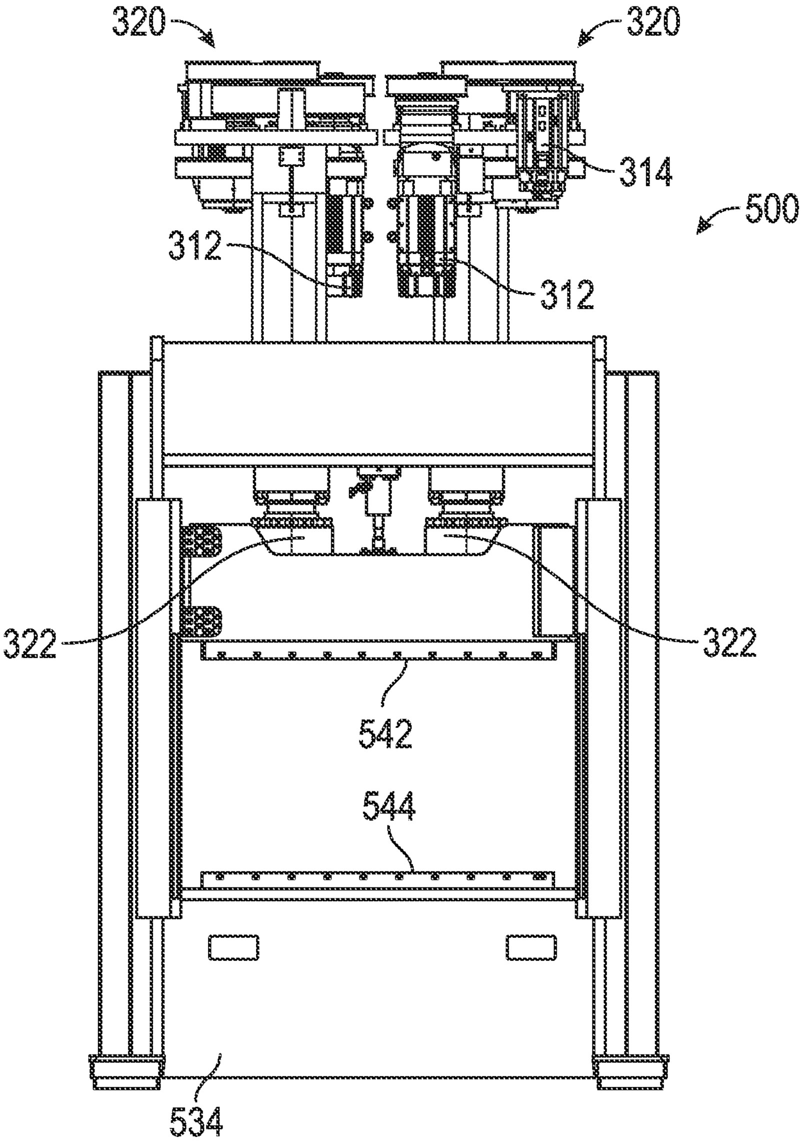
FIG. 9B is a side view of the gib-style press machine of FIG. 9A.

FIGS. 9A and 9B illustrate the use of two linear actuators 320 in a gib-style press machine 500. Instead of sliding on posts, the press ram 532 moves along gibs (e.g., wedge-shaped gibs) located within the frame of the press machine 500. The gibs precisely guide the reciprocating motion of the press ram 532 toward and away from the base 534. The linear actuators 320 are mounted to the frame so as to remain stationary while the actuator rods 322 are mounted to and move the press ram 532. An upper tool 542 and a lower tool 544 are mounted, respectively, to the press ram 532 and the press base 534. By using two actuators 320 in parallel, the amount of force on the press ram 532 produced by the first motors 312 can be doubled so as to provide extra force that is necessary to form the parts by the tools 542, 544. Further, the high-speed movement of the press ram 532 in the advancement stroke and the retraction stroke is brought about by the synchronous operation of the second motors 314 on both of the linear actuators 320.

Figure 10:
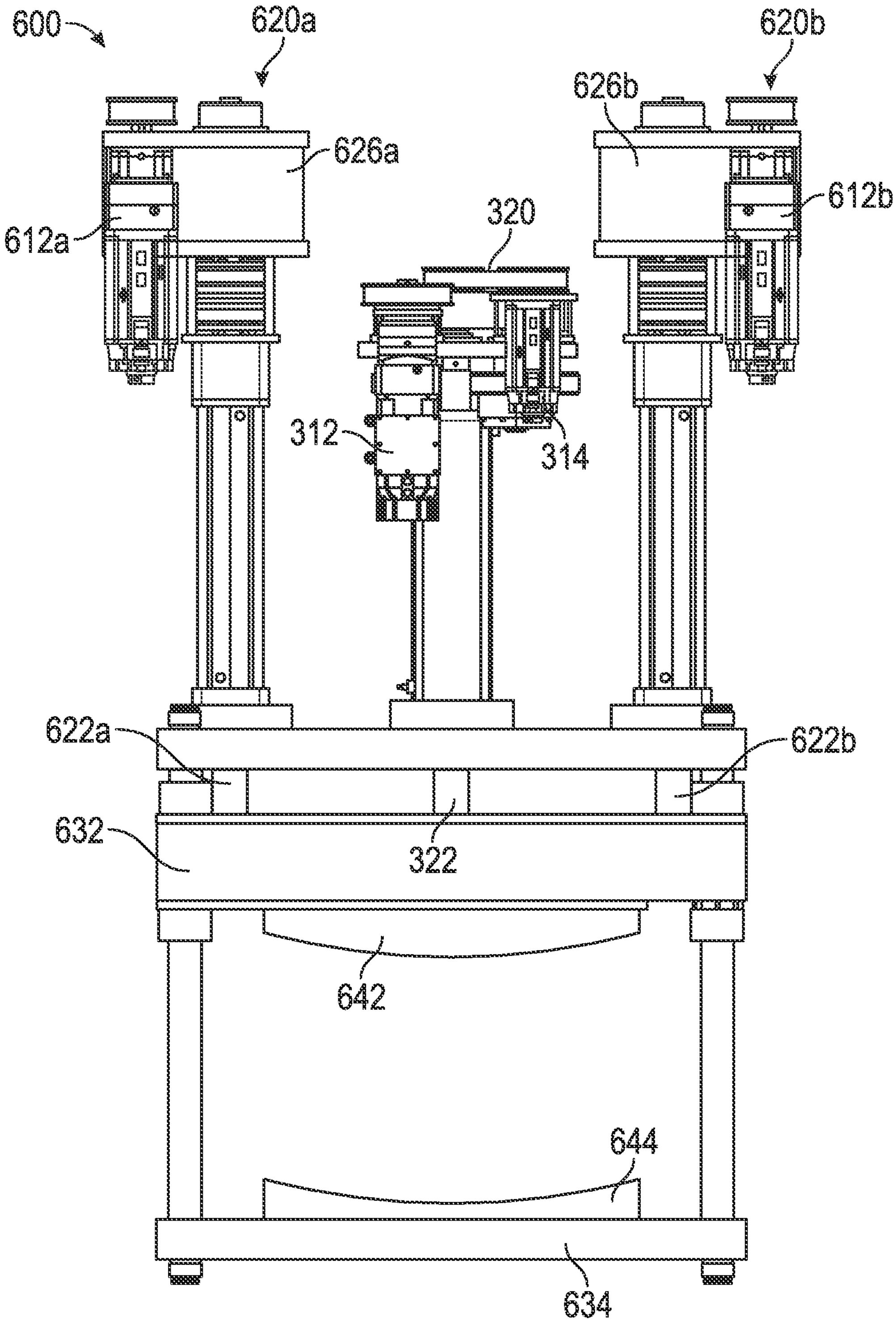
FIG. 10 is a perspective view of a press machine that is driven by the single linear actuator illustrated in FIG. 7 and multiple high-force, low speed linear actuators.
Figure 11A:
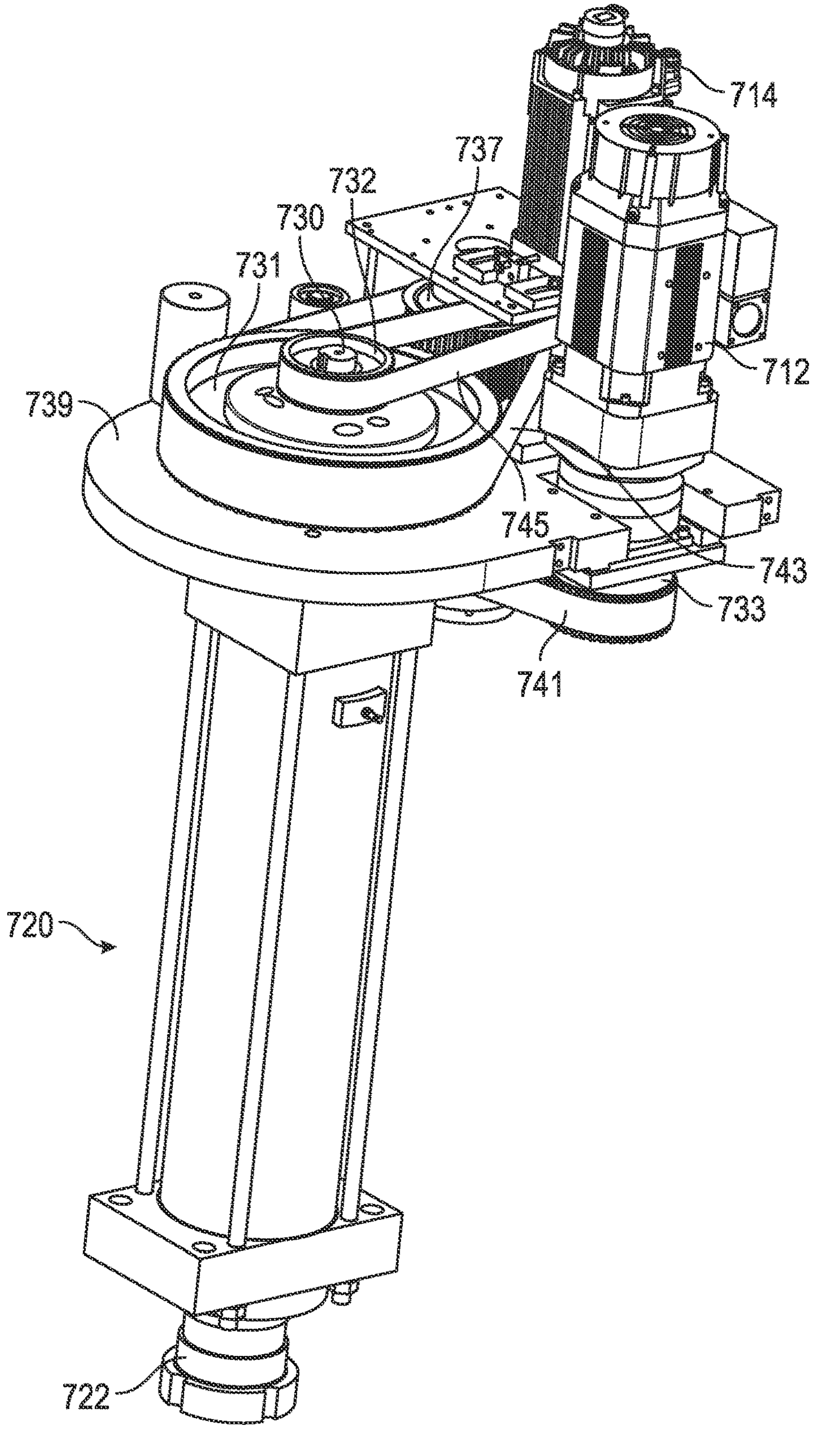
FIG. 11A is a perspective view of a further alternative linear actuator having two motors and a clutch system.
Figure 11B:
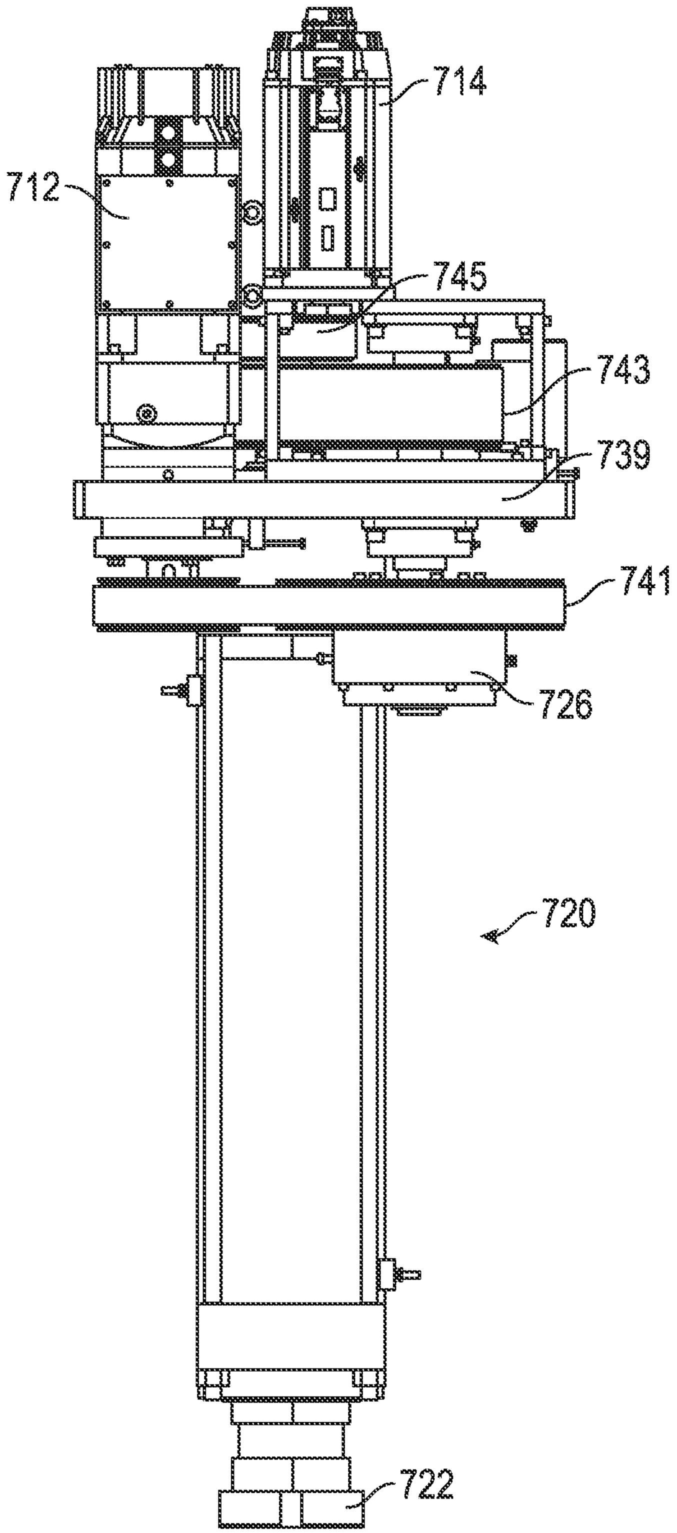
FIG. 11B is a side view of the alternative linear actuator of FIG. 11A.
Figure 11C:
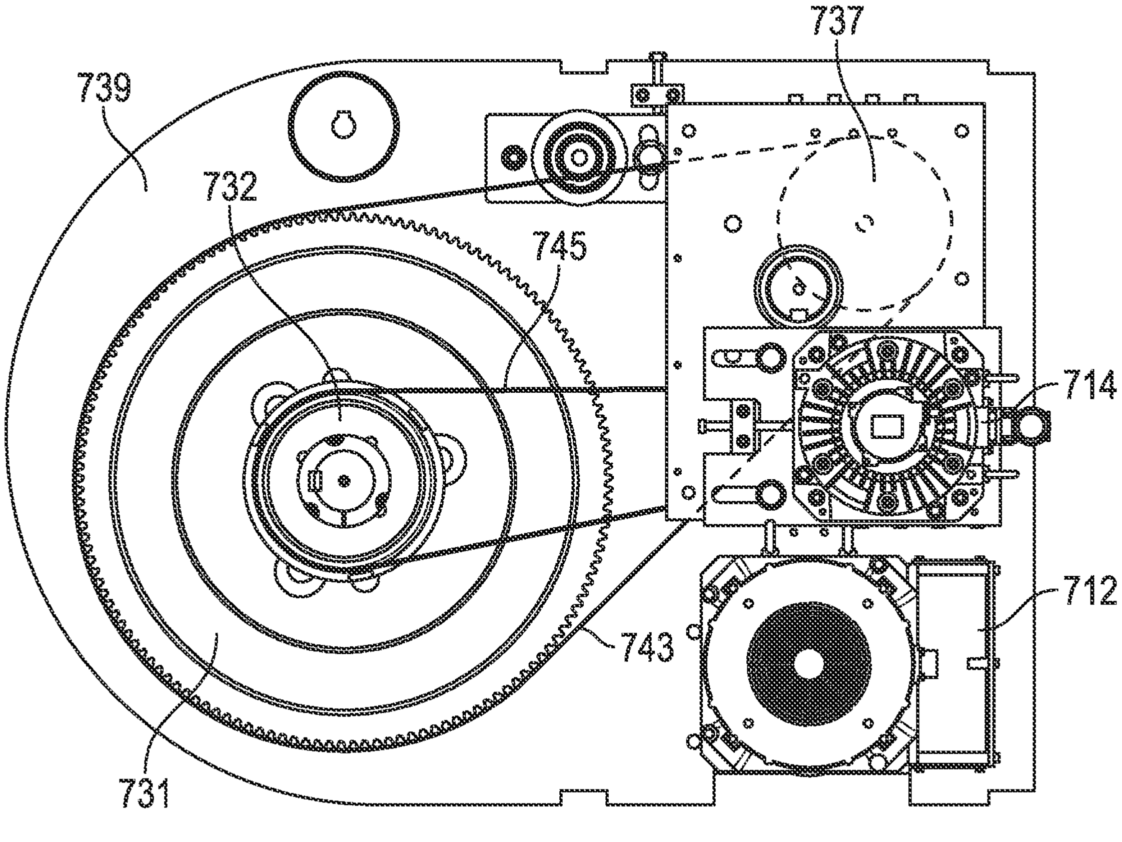
FIG. 11C is a top view of the alternative linear actuator of FIG. 11A.
Figure 11D:
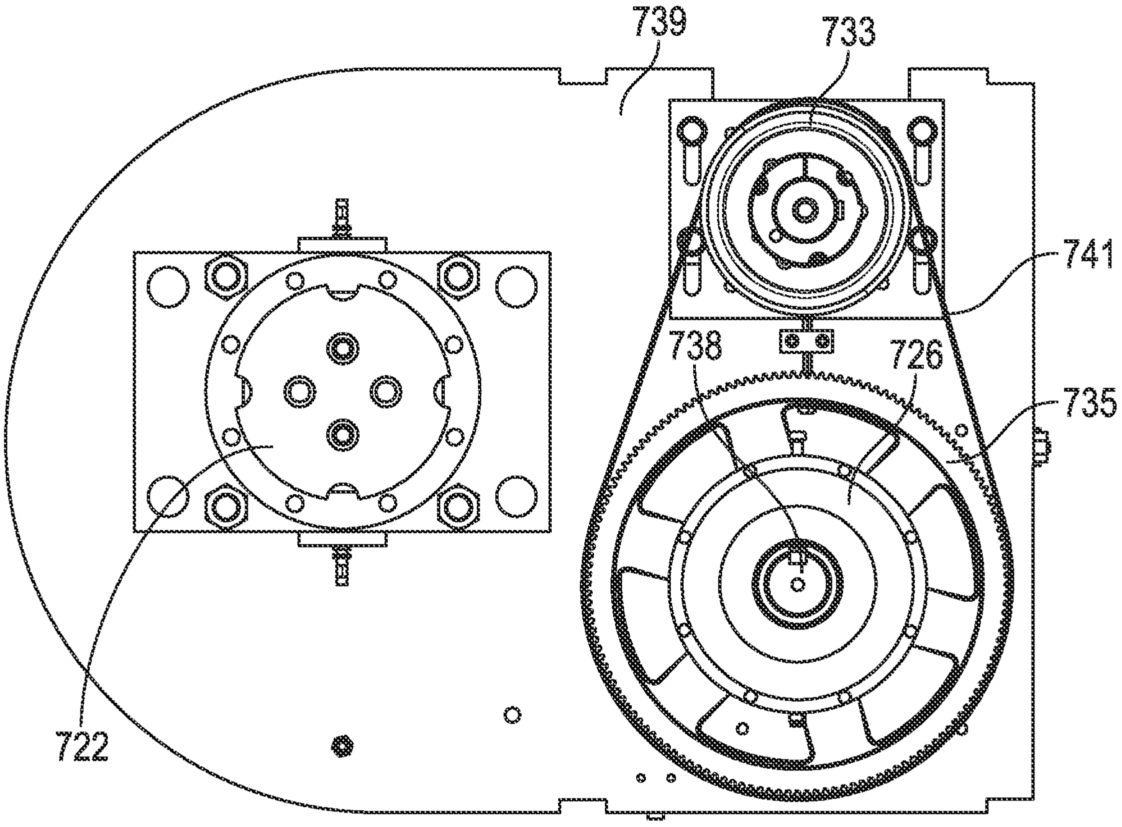
FIG. 11D is a bottom view of the alternative linear actuator of FIG. 11A.

FIG. 10 illustrates alternative post-style press machine 600 using multiple linear actuators 320, 620*a*, 620*b*. The middle linear actuator 320 (described in detail relative to FIG. 7) includes the first motor 312 for delivering high force to the press ram 632 when forming a part, and the second motor 314 for delivering high speed to the press ram 632 in the advancement and retraction strokes. The other two linear actuators 620*a*, 620*b* in the press machine 600 include only a first motor 612*a*, 612*b* that delivers high force to the press ram 632 when the part is being formed. Consequently, the press ram 632 moves at a high speed relative to the base 634 in the advancement and retraction strokes under the power of only the second motor 314 of the middle linear actuator 320. When that high-speed condition occurs, the first motors 612*a*, 612*b* of the other two linear actuators 620*a*, 620*b* are protected from high speed conditions by use of clutches 626*a*, 626*b*, which operate in the same manner as the clutch 326 described relative to the actuator 320 in FIG. 7. The clutches 626*a*, 626*b* are coupled to the output shaft of the first motors 612*a*, 612*b* either directly or indirectly, such as through an intermediate shaft that is driven by the first motors 612*a*, 612*b* via a belt. When the part is being formed by the tools 642, 644 and higher force is needed, the first motors 612*a*, 612*b* are operational and the clutches 626*a*, 626*b* engage to permit the torque to be transferred to the first male-female thread mechanism of the linear actuators 620*a*, 620*b*. The high torque from the first motors 612*a*, 612*b* is converted to a high force by the first male-female thread mechanism and transferred to the actuators rods 622*a*, 622*b*, which drive the press ram 632. At the same time, the first motor 312 of the middle linear actuator is also delivering high force to the press ram 632. The embodiment of the press machine 600 of FIG. 10 may allow for forces in excess of 300 tons (e.g., more than 100 tons delivered per actuator 320, 620*a*, 620*b*) when needed, but lesser force amounts can be delivered by powering the three first motors 312. 612*a*, 612*b* at lower levels to produce less torque.

FIGS. 11A-11D illustrate an alternative linear actuator 720 that is similar to the linear actuator 120 of FIG. 5 and the linear actuator 321 of FIG. 7. The linear actuator 720 includes a first motor 712 and a second motor 714 that drive a ram for a press machine in the same manner and configurations described in the exemplary press machines 400, 500, and 600 of FIGS. 8-10. The linear actuator 720 includes a clutch 726 (FIGS. 11B and 11D) to protect the high-torque first motor 712 from the high rotational speeds that could otherwise damage the first motor 712 when the second motor 714 is advancing and retracting the press ram from the part.

The first motor 712 and the second motor 714 cause the rotation of an actuator input shaft 730 via a first actuator sprocket 731 and a second actuator sprocket 732, respectively. A first belt system couples the first motor 712 and the first actuator sprocket 720 and includes a first belt 741 and a second belt 743. The first belt 741 engages a first motor sprocket 733 and a bottom intermediate sprocket 735 (FIG. 11D) below a mounting platform 739 of the actuator 720. The second belt 743 engages a top intermediate sprocket 737 and the first actuator sprocket 731. The bottom intermediate sprocket 735 (FIG. 11D) and the top intermediate sprocket 737 are located on and rotate around an intermediate shaft 738. The clutch 726 is also coupled to the intermediate shaft 738 below the platform 739. In one embodiment, the first motor 714 rotates at a speed of about 250 RPM and delivers about 1050 Nm of torque, causing the actuator input shaft to rotate at a speed of 50 RPM and delivers about 5200 nm of torque. As such, in this embodiment, the torque output from the first motor shaft is increased by the first belt system by about a factor of 5 relative to the torque at the actuator input shaft that ultimately drives the actuator rod 722. The present invention contemplates the first belt system increasing the torque output from the first motor to the actuator input shaft in the range of 3 to 7.

The second motor 714 is directly coupled to the second actuator sprocket 732 by a single belt 745. The single belt 745 engages a second-motor sprocket (not shown) on the output shaft of the second motor 714. As the second motor 714 is used for the high-speed, low-force movement of the actuator rod 722 and the press ram that coupled to the rod 722, the ratio of the diameters of the second-motor sprocket and the second actuator sprocket 732 dictates the speed of the actuator input shaft relative to the second motor drive shaft. In one embodiment, the ratio of the diameter of second actuator sprocket 732 to the diameter of the second motor sprocket (mounted to the second motor 714, but not shown) is in the range from about 2:1 to about 3:1.

Because the actuator input shaft has the second actuator sprocket 732 that is driven by the second motor 714 and the first actuator sprocket 731 that is driven by the first motor 712, the drive function of either motor 712, 714 results in rotation of the motor input shaft of the other motor. Hence, the clutch 726 limits the rotational speed of the first motor 712 when the second motor 714 is driving the actuator 720 at a high rotational speed.

In an alternative arrangement, the actuator 720 can be configured such that both the first motor 712 and the second motor 714 are coupled to intermediate sprockets on the same intermediate shaft via first and second belts. The intermediate shaft would include a drive sprocket that is directly coupled to a sprocket on the actuator 720. Thus, only a single belt is coupled to and drives the actuator 720.

Figure 12:
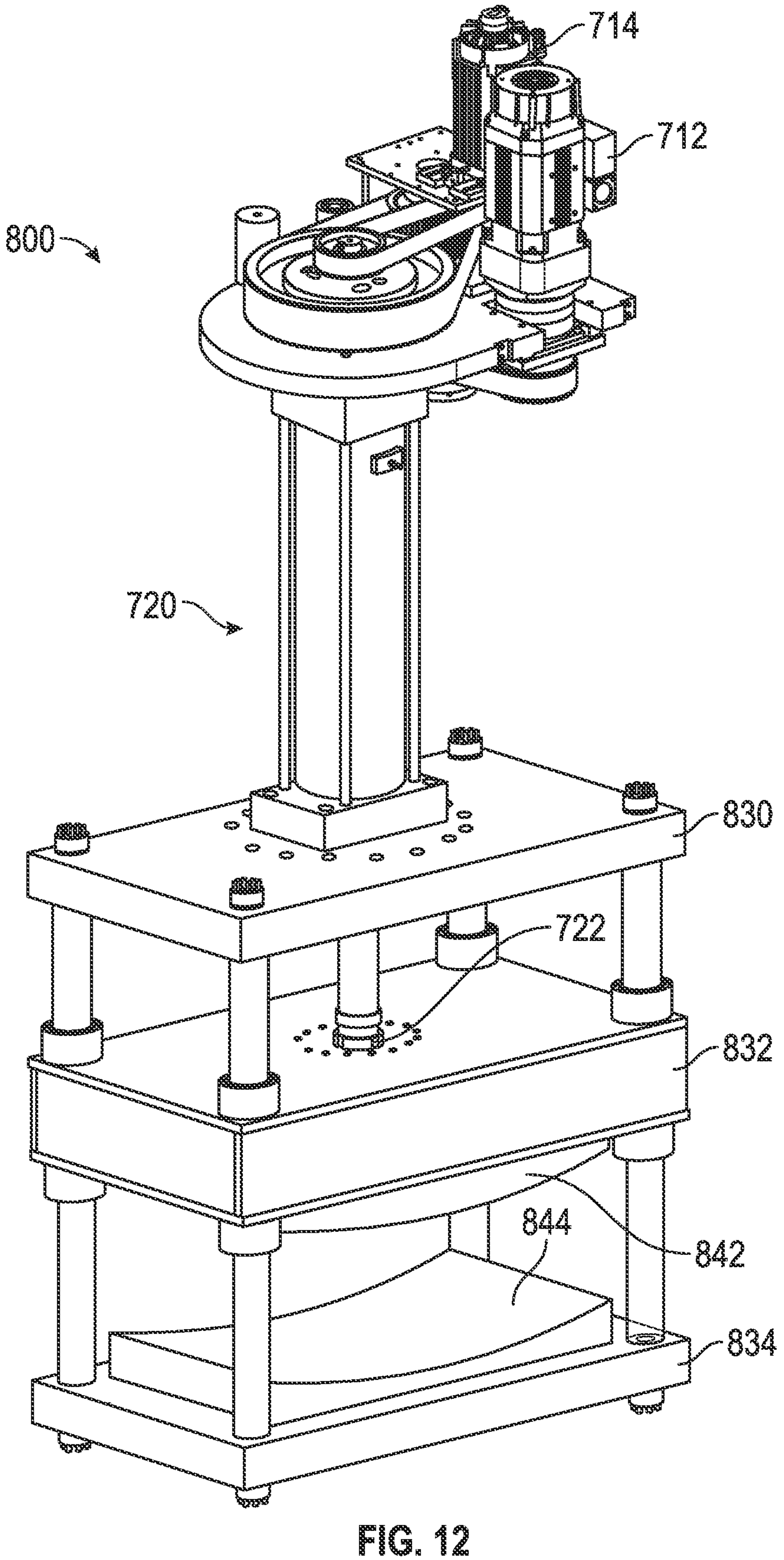
FIG. 12 is a perspective view of a four-post press machine that is driven by the linear actuator of FIG. 11.

FIG. 12 illustrates the actuator 720 of FIG. 11 within a four-post press 800. The actuator 720 is mounted to the stationary press crown 830 and the actuator rod 722 is mounted to the press ram 832. The press ram 832 moves under the power of the actuator rod 722 to and from the press base 834 based on the outputs of the first motor 712 and second motor 714, as described above relative to FIG. 11. The press ram 832 holds an upper tool 842 and the press base 834 holds a lower tool 844. A part is formed by the four-post press 800 between the upper tool 842 and lower tool 844. As shown, the upper tool 842 and lower tool 844 are for forming a curved sheet-metal part, but a variety of different forming, cutting, and punching tools can be applied to the press machine 800. The press machine 800 may include a brake to hold the position of the press ram 832 when the press machine 800 is powered down or at a steady state.

When the part is being formed during the low-speed, high-force stroke of the cycle, both of the first motor 712 and the second motor 714 are rotating as the low-speed, high-force first motor 714 provides power to the actuator 720 because there is no clutch or mechanism to disconnect the second motor 714 from the actuator 720. In other words, while the actuator 720 is being powered by the first motor 712, the second-motor belt 745 is still turning due to the rotation of the second actuator sprocket 732 (see FIGS. 11A and 11C), which causes the second motor 714 to rotate. As such, during the low-speed, high-force stroke of the cycle, the second motor 714 is preferably operational to provide torque (albeit a smaller amount of torque relative to the torque provided by the first motor 712) such that the torque of the high-speed, low-force second motor 714 is additive to the torque of the low-speed, high-force first motor 712.

Like the actuator 320 from FIG. 7, the actuator 720 can be used in various types of press machines (e.g., gib-style presses) and other metal bending machines, such as press brake machines and metal bending machines, in which a high-forces (e.g. +100 tons) are required. Furthermore, like the actuator 320 from FIG. 7, the actuator 720 can be used in multiple actuator arrangements, such as those shown in FIGS. 9-10.

In the press machines with the multi-speed linear actuators in accordance to the previous embodiments of FIGS. 1-12, the downward force can result in 75 tons, 100 tons, 125 tons, 150 tons, 175 tons, 200 tons or more than 200 tons of force on the part in the working stroke driven by the first motor(s). In one embodiment, the force provided by the linear actuators of the press machine is at least 50 tons, but preferably more than 100 tons. Press machine systems using multiple actuators (e.g., FIGS. 9 and 10) can deliver in excess 200 tons, 300 tons, 400 tons, or 500 tons by adding additional actuators with high-torque, low-speed motor systems. Further, the linear press machines will provide a linear velocity of the press ram (and upper tool) via the actuator typically in the range of 300 to 700 inches per minute in the advancement and retraction strokes driven by the second motor(s). In one embodiment, the velocity of the actuator is at least 250 inches per minute, is preferably greater than 500 inches per minute, and is most preferably greater than 750 inches per minute (such as 800 or 900 inches per minute) in the advancement and retraction strokes. In these embodiments, the linear velocity of the linear actuator and, hence, the press ram in the advancement stroke is: greater than about 4 times the linear velocity in the working stroke when the part is being formed, greater than about 5 times the linear velocity in the working stroke when the part is being formed, greater than about 6 times the linear velocity in the working stroke when the part is being formed, greater than about 7 times the linear velocity in the working stroke when the part is being formed, greater than about 8 times the linear velocity in the working stroke when the part is being formed, greater than about 9 times the linear velocity in the working stroke when the part is being formed, or greater than about 10 times the linear velocity in the working stroke when the part is being formed.

In the previous embodiments, the pulleys and belts can be interchanged with gears or other drive systems. Similarly, the sprockets and belts can be interchanged with gears or other drive systems.

As shown in the figures, the multi-speed linear actuators of the present invention are contemplated for use on the press machines in which the press ram slides along posts, such as a four-post press (all four posts can be seen, for example, in FIG. 8) or a two-post press. Furthermore, the present invention is also contemplated for use on the press machines in which the press ram moves along gibs (e.g., wedge-shaped gibs) in the frame that guide the reciprocating motion of the press ram.

These embodiments and obvious variations thereof is contemplated as falling within the spirit and scope of the claimed invention, which is set forth in the following claims. Moreover, the present concepts expressly include any and all combinations and subcombinations of the preceding elements and aspects.

We claim:

1. A linear-actuated press machine for forming a part, comprising:

a moveable press ram for holding a tool that forms the part;

an actuator for moving the moveable press ram by use of a male-female thread mechanism for producing a linear movement of the moveable press ram, the male-female thread mechanism includes an actuator screw that rotates but remains linearly stationary and a nut that moves along the actuator screw as the actuator screw rotates, the nut being coupled to the press ram, the actuator including first and second actuator sprockets coupled to the actuator screw for rotating the actuator screw;

a first motor drive system for producing a low-speed high-force linear movement to the moveable press ram via the actuator, the first motor drive system including a first motor for driving a first motor sprocket, a clutch, a first belt system coupling the first motor sprocket to the first actuator sprocket;

a second motor drive system for producing a high-speed low-force linear movement to the moveable press ram via the actuator, the second motor drive system including a second motor for driving a second motor sprocket and a second belt system coupling the second motor sprocket to the second actuator sprocket;

wherein, in response to the high-speed low-force linear movement of the second motor drive system to advance or retract the press ram relative to the part, the clutch at least partially disengages the first motor from the actuator to maintain a rotational speed of the first motor below a limit to reduce possible damage to the first motor; and wherein, in response to the low-speed high-force linear movement of the first motor system to form the part, the clutch is operationally engaged to transfer torque from the first motor to the first actuator sprocket of the linear actuator via the first belt system.

2. The press machine of claim 1, wherein the linear velocity for the press ram is at least about 500 inches per minute when advancing the press ram toward the to-be-formed part by use of the second motor drive system.

3. The press machine of claim 2, wherein the low-speed high-force linear movement of the first motor drive system provides at least 100 tons of force to the part.

4. The press machine of claim 3, wherein the linear velocity of the press ram during the advancement with the second motor drive system is greater than 5 times the linear velocity of the press ram when forming the part with the first motor drive system.

5. The press machine of claim 1, wherein the first motor drive system increases the torque output from the first motor to the actuator by a factor in the range of 3 to 7.

6. The press machine of claim 1, wherein the first actuator sprocket and the second actuator sprocket are mounted around an actuator input shaft.

7. The press machine of claim 6, wherein the first actuator sprocket has a larger diameter than the second actuator sprocket.

8. The press machine of claim 7, wherein the first actuator sprocket and the second actuator sprocket are adjacent to each other on the actuator input shaft, and further including a mounting platform, the first and second motors being mounted to the mounting platform, the first actuator sprocket and the second actuator sprocket being located on one side of the mounting platform and the moveable press ram being located on the other side of the mounting platform.

9. The press machine of claim 1, wherein the clutch is located on an intermediate shaft that is positioned away from the first motor and the actuator, and wherein the first belt system includes a first belt and a second belt, the first belt coupling the first motor sprocket to the intermediate shaft, the second belt coupling the intermediate shaft to the first actuator sprocket.

10. The press machine of claim 1, wherein the clutch is a bi-directional clutch that limits the rotational speed of the first motor (i) in a first direction when the second motor system is advancing the press ram toward the part and (ii) in a second direction when the second motor system is retracting the press ram away from the part.

11. A linear-actuated press machine for forming a part, comprising:

a moveable press ram for holding a tool that forms the part;

an actuator including an actuator rod, at least one actuator sprocket, and a male-female thread mechanism, the male-female thread mechanism including a rotatable screw that remains linearly stationary and a nut that translates vertically along the rotatable screw, the actuator rod being coupled to the nut, the actuator rod producing a linear movement of the moveable press ram, the at least one actuator sprocket for driving the rotatable screw;

a first motor drive system for producing a low-speed high-force linear movement to the moveable press ram via the actuator, the low-speed high-force linear movement causing greater than 100 tons of force to be delivered by the tool to the part, the first motor drive system including a first motor for directly driving a first motor sprocket, a bi-directional clutch, and a first belt system coupling the first motor sprocket to the at least one actuator sprocket;

a second motor drive system for producing a high-speed low-force linear movement to the moveable press ram via the actuator, the second motor drive system including a second motor for directly driving a second motor sprocket and a second belt system coupling the at least one actuator sprocket to the second motor sprocket; and wherein, in response to the high-speed low-force linear movement of the second motor drive system for advancing the press ram toward the part or for retracting the press ram from the part after the part has been formed, (i) the at least one actuator sprocket rotates at a high rotational speed, and (ii) the bi-directional clutch at least partially disengages the first motor to maintain a rotational speed of the first motor below a limit to reduce possible damage to the first motor;

wherein, in response to the low-speed high-force linear movement of the first motor system to form the part, the bi-directional clutch is operationally engaged to transfer torque from the first motor to the at least one actuator sprocket of the linear actuator via the first belt system.

12. The press machine of claim 11, wherein the linear velocity for the press ram is at least about 400 inches per minute when advancing the press ram toward the to-be-formed part by use of the second motor drive system.

13. The press machine of claim 12, wherein the linear velocity of the press ram during the advancement with the second motor drive system is greater than 5 times the linear velocity of the press ram when forming the part with the first motor drive system.

14. The press machine of claim 11, wherein the first motor drive system increases the torque output from the first motor to the actuator by a factor in the range of 3 to 7.

15. The press machine of claim 11, wherein the at least one actuator sprocket includes a first actuator sprocket and a second actuator sprocket, the first actuator sprocket being coupled to the first belt system, the second actuator sprocket being coupled to the second belt system.

16. The press machine of claim 15, wherein the first actuator sprocket has a larger diameter than the second actuator sprocket.

17. The press machine of claim 15, wherein the first actuator sprocket and the second actuator sprocket are adjacent to each other and located at a first end of the actuator, the actuator rod moving away from a second end of the actuator and toward the part, the second end being opposite to the first end.

18. The press machine of claim 15, further including a mounting platform, the first and second motors being mounted to the mounting platform, the first actuator sprocket and the second actuator sprocket being on one side of the mounting platform and the moveable press ram being on the other side of the mounting platform.

19. The press machine of claim 11, wherein the bi-directional clutch is located on an intermediate shaft that is positioned away from the first motor and the actuator, and wherein the first belt system includes a first belt and a second belt, the first belt coupling the first motor sprocket to the intermediate shaft, the second belt coupling the intermediate shaft to the first actuator sprocket.

20. A method of operating a linear-actuated press machine for forming a part, the press machine comprises a first motor, a second motor, a linear actuator having a male-female thread mechanism with a rotatable screw and a nut that moves along the rotatable screw, a press ram holding a tool and being coupled to the linear actuator via an actuator rod, the actuator rod being coupled to the nut that moves along the rotatable screw, the method comprising:

(i) rotating, by use of the second motor, the rotatable screw of the linear actuator while maintaining the rotatable screw in a linearly stationary position, the rotating causing the nut to move along the rotatable screw and the press ram to advance toward the part in a low-force and high-linear-speed condition;

(ii) while advancing the press ram toward the part in the low-force and high-linear-speed condition of the second motor, partially or fully disengaging a clutch so as to reduce the rotational movement on the first motor; and (iii) subsequent to acts (i) and (ii) and while the clutch is engaged to allow the linear actuator to be driven by the first motor, forming the part with the tool in a low-speed and high-force linear movement condition, the low-speed and high-force linear movement condition being produced by rotating the rotatable screw with the first motor while maintaining the rotatable screw in a linearly stationary position so that the nut moves along the rotatable screw.

* * * * *